(12) United States Patent
Takahashi et al.

(10) Patent No.: US 10,412,426 B2
(45) Date of Patent: Sep. 10, 2019

(54) TRANSMISSION DEVICE, RECEIVING DEVICE, AND DATA PROCESSING METHOD

(71) Applicant: SONY CORPORATION, Tokyo (JP)

(72) Inventors: Kazuyuki Takahashi, Chiba (JP); Lachlan Bruce Michael, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/741,863

(22) PCT Filed: Sep. 5, 2016

(86) PCT No.: PCT/JP2016/075938
§ 371 (c)(1),
(2) Date: Jan. 4, 2018

(87) PCT Pub. No.: WO2017/047424
PCT Pub. Date: Mar. 23, 2017

(65) Prior Publication Data
US 2018/0199077 A1    Jul. 12, 2018

(30) Foreign Application Priority Data

Sep. 17, 2015 (JP) ................................. 2015-184540

(51) Int. Cl.
*H04N 21/235* (2011.01)
*H04N 21/236* (2011.01)
(Continued)

(52) U.S. Cl.
CPC .......... *H04N 21/2385* (2013.01); *H04J 11/00* (2013.01); *H04L 5/0053* (2013.01);
(Continued)

(58) Field of Classification Search
CPC ............... H04N 21/235; H04N 21/236; H04N 21/23614; H04N 21/2362; H04N 21/238
(Continued)

(56) References Cited

U.S. PATENT DOCUMENTS

2010/0085985 A1* 4/2010 Pekonen ............... H04L 1/0071
                                                                    370/474
2012/0076127 A1   3/2012 Mourad et al.
(Continued)

FOREIGN PATENT DOCUMENTS

JP    2012-90039 A     5/2012
WO   2010/038133 A2   4/2010
WO   2011/098426 A1   8/2011

OTHER PUBLICATIONS

International Search Report dated Dec. 6, 2016 in PCT/JP2016/075938.

(Continued)

*Primary Examiner* — Dominic D Saltarelli
(74) *Attorney, Agent, or Firm* — Oblon, McClelland, Maier & Neustadt, L.L.P.

(57) ABSTRACT

The present technology relates to a transmission device, a receiving device, and a data processing method that enable bandwidth control over PLPs when one frequency band includes the plurality of PLPs. The transmission device determines the number of cells of a component to be transmitted by each of PLPs such that the number of cells in an entire physical layer frame including the plurality of PLPs matches a sum of the number of cells of the plurality of PLPs, and transmits a broadcast stream including the physical layer frame. The present technology can be applied to, for example, a system for transmitting a broadcast stream including a physical layer frame including a plurality of PLPs.

15 Claims, 25 Drawing Sheets

(51) Int. Cl.
  *H04N 21/238* (2011.01)
  *H04N 21/2385* (2011.01)
  *H04J 11/00* (2006.01)
  *H04N 21/438* (2011.01)
  *H04L 5/00* (2006.01)
  *H04N 21/4385* (2011.01)
  *H04L 1/00* (2006.01)
  *H04N 21/2362* (2011.01)

(52) U.S. Cl.
  CPC ....... *H04N 21/438* (2013.01); *H04N 21/4385* (2013.01); *H04L 1/0071* (2013.01); *H04N 21/2362* (2013.01)

(58) Field of Classification Search
  USPC .......................................................... 725/146
  See application file for complete search history.

(56) References Cited

U.S. PATENT DOCUMENTS

2013/0121438 A1* 5/2013 Murakami ........... H04B 7/0456
  375/295

2015/0071153 A1* 3/2015 Hong .................... H04L 5/0023
  370/311
2015/0085735 A1 3/2015 Shelby et al.

OTHER PUBLICATIONS

"Digital Video Broadcasting (DVB); Frame structure channel coding and modulation for a second generation digital terrestrial television broadcasting system (DVB-T2)", ETSI EN 302 755 V1.2.1, Oct. 2010, 177 pages.

"Digital Video Broadcasting (DVB); Frame structure channel coding and modulation for a second generation digital terrestrial television broadcasting system (DVB-T2)", ETSI EN 302 755 V1.4.1, Jul. 2015, 7 pages.

Extended European Search Report dated Jun. 27, 2019 in European Application No. 16846295.0.

"Digital Video broadcasting (DVB); Modular Interface (T2-MI) for a second generation digital terrestrial television broadcasting system (DVB-T2)", ETSI TS 102 773 v1.1.1, Sep. 2009 (36 pgs).

\* cited by examiner

FIG.6

```
EXAMPLE OF PARAMETERS OF Subframe for i=0 L1B_num_subframes { if(i>0) {
                    L1D_mimo
                    L1D_miso
                    L1D_fft_size
                    L1D_reduced_carriers
                    L1D_guard_interval
                    L1D_num_ofdm_symbols
                    L1D_scattered_pilot_pattern
                    L1D_scattered_pilot_boost
                    L1D_sbs_first
                    L1D_sbs_last

EXAMPLE OF PARAMETERS OF PLP

| |
|---|
| for j=0 L1D_num_plp{ |
|     L1D_plp_id |
|     L1D_plp_slt_exist |
|     L1D_plp_layer |
|     L1D_plp_start |
|     L1D_plp_size |
|     L1D_plp_scrambler_type |
|     L1D_plp_fec_type |
|     if(L1D_plp_fec_type ∈ {0, 1, 2, 3, 4, 5}) { |
|         L1D_plp_mod |
|         L1D_plp_cod |
|     } |
|     L1D_plp_TI_mode |
| |
|     if(L1D_plp_TI_mode=01) { |
|         ⋮ |

FIG. 9
A SEGMENT BANDWIDTH CHANGE METHOD
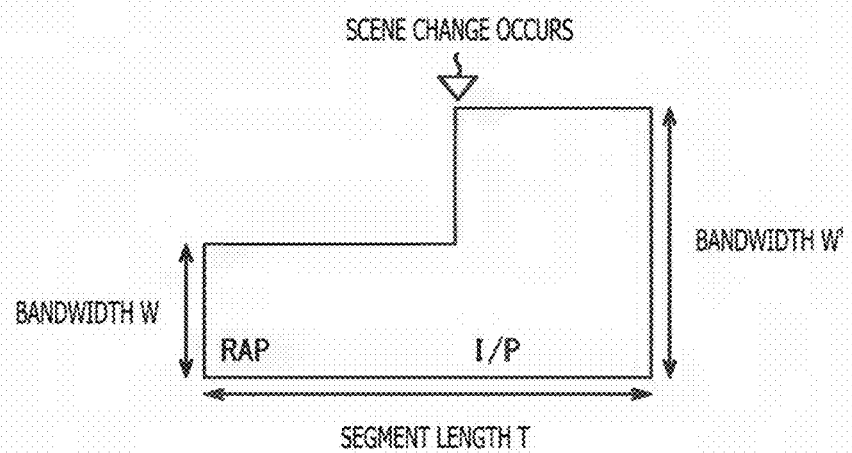
B SEGMENT DIVISION METHOD
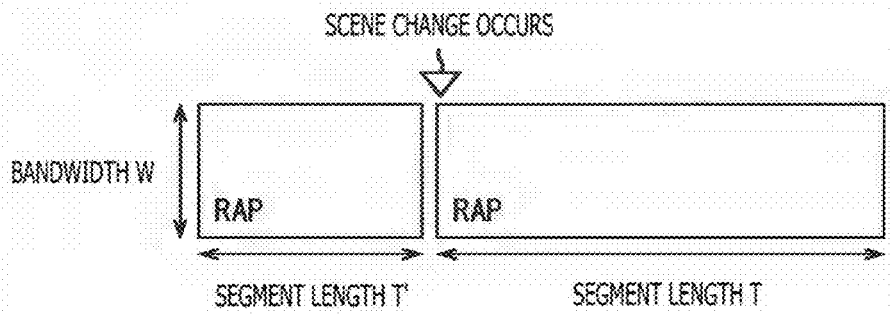

FIG. 11

| No | BANDWIDTH CONTROL METHOD | BANDWIDTH | SEGMENT LENGTH | SEGMENT SWITCHING TIME | HANDLING AT OCCURRENCE OF SCENE CHANGE |
|---|---|---|---|---|---|
| 1 | BANDWIDTH CONTROL METHOD 1 | CONSTANT | CONSTANT | SIMULTANEOUS | — |
| 2 | BANDWIDTH CONTROL METHOD 2 | CONSTANT | CONSTANT/VARIABLE | INDIVIDUAL | — |
| 3 | BANDWIDTH CONTROL METHOD 2B | CONSTANT | CONSTANT/VARIABLE | INDIVIDUAL | SEGMENT DIVISION METHOD |
| 4 | BANDWIDTH CONTROL METHOD 3 | VARIABLE | CONSTANT | SIMULTANEOUS | — |
| 5 | BANDWIDTH CONTROL METHOD 3A | VARIABLE | CONSTANT | SIMULTANEOUS | SEGMENT BANDWIDTH CHANGE METHOD |
| 6 | BANDWIDTH CONTROL METHOD 4 | VARIABLE | CONSTANT/VARIABLE | INDIVIDUAL | — |
| 7 | BANDWIDTH CONTROL METHOD 4A | VARIABLE | CONSTANT/VARIABLE | INDIVIDUAL | SEGMENT BANDWIDTH CHANGE METHOD |
| 8 | BANDWIDTH CONTROL METHOD 4B | VARIABLE | CONSTANT/VARIABLE | INDIVIDUAL | SEGMENT DIVISION METHOD |

TRANSMISSION DEVICE, RECEIVING DEVICE, AND DATA PROCESSING METHOD

TECHNICAL FIELD

The present technology relates to a transmission device, a receiving device, and a data processing method, and particularly relates to a transmission device, a receiving device, and a data processing method that enable bandwidth control over PLPs when one frequency band includes the plurality of PLPs.

BACKGROUND ART

It has been determined that the ATSC (Advanced Television Systems Committee) 3.0, which is one of the next-generation terrestrial broadcasting standards, will mainly employ IP/UDP, i.e., the method of using IP (Internet Protocol) packets including UDP (User Datagram Protocol) packets (hereinafter referred to as IP transmission method) for data transmission, instead of TS (Transport Stream) packets. Moreover, broadcasting standards other than ATSC 3.0 are also expected to employ the IP transmission method in the future.

Here, transmission data such as content can be transmitted in units of PLPs (Physical Layer Pipes) (for example, refer to NPL 1). In ATSC 3.0, moreover, one frequency band (for example, a frequency band of 6 MHz corresponding to one channel (physical channel)) includes one or a plurality of PLPs (Physical Layer Pipes).

CITATION LIST

Non Patent Literature

[NPL 1]
ETSI EN 302 755 V1.2.1 (2010 October)

SUMMARY

Technical Problem

However, since there is no established technological method for including a plurality of PLPs in one frequency band, there has been a demand for a proposal for performing bandwidth control over PLPs when one frequency band includes the plurality of PLPs.

The present technology has been made in view of the foregoing circumstances and enables bandwidth control over PLPs when one frequency band includes the plurality of PLPs.

Solution to Problem

A transmission device according to a first aspect of the present technology includes a processing unit and a transmission unit. The processing unit determines the number of cells of a component to be transmitted by each of PLPs (Physical Layer Pipes) such that the number of cells in an entire physical layer frame including the plurality of PLPs matches a sum of the number of cells of the plurality of PLPs. The transmission unit transmits a broadcast stream including the physical layer frame.

The transmission device according to the first aspect of the present technology may be an independent device or may be an internal block constituting one device. Further, a data processing method according to the first aspect of the present technology is a data processing method corresponding to the above-described transmission device according to the first aspect of the present technology.

In the transmission device and the data processing method according to the first aspect of the present technology, the number of cells of a component to be transmitted by each of PLPs is determined such that the number of cells in an entire physical layer frame including the plurality of PLPs matches a sum of the number of cells of the plurality of PLPs. A broadcast stream including the physical layer frame is transmitted.

A receiving device according to a second aspect of the present technology includes a receiving unit and a processing unit. The receiving unit receives a broadcast stream including a physical layer frame which includes a plurality of PLPs and in which the number of cells of a component transmitted by each of the PLPs is allocated such that the number of cells in the entire physical layer frame matches a sum of the number of cells of the plurality of PLPs. The processing unit processes the physical layer frame.

The receiving device according to the second aspect of the present technology may be an independent device or may be an internal block constituting one device. Further, a data processing method according to the second aspect of the present technology is a data processing method corresponding to the above-described receiving device according to the second aspect of the present technology.

In the receiving device and the data processing method according to the second aspect of the present technology, a broadcast stream including a physical layer frame which includes a plurality of PLPs and in which the number of cells of a component transmitted by each of the PLPs is allocated such that the number of cells in the entire physical layer frame matches a sum of the number of cells of the plurality of PLPs is received. The physical layer frame is processed.

Advantageous Effects of Invention

According to the first aspect and the second aspect of the present technology, bandwidth control over PLPs can be performed when one frequency band includes the plurality of PLPs.

Note that the effects described herein are not necessarily limitative, and any of the effects described in the present disclosure may be exhibited.

BRIEF DESCRIPTION OF DRAWINGS

FIG. 6 is a diagram illustrating an example of parameters of a subframe.

FIG. 7 is a diagram illustrating an example of parameters of a PLP.

FIG. 9 is a diagram for describing a segment bandwidth change method and a segment division method when a scene change occurs.

FIG. 11 is a diagram illustrating a list of bandwidth control methods of the present technology.

DESCRIPTION OF EMBODIMENTS

Hereinafter, an embodiment of the present technology will be described with reference to the drawings. Note that the description will be made in the following order.
1. System Configuration
2. Overview of Bandwidth Control over PLPs to Which Present Technology is Applied
3. Specific Examples of Bandwidth Control
4. Flow of Processing Executed by Each Device
5. Modification
6. Computer Configuration <1. System Configuration>
(Exemplary Configuration of Transmission System)

Figure 1:
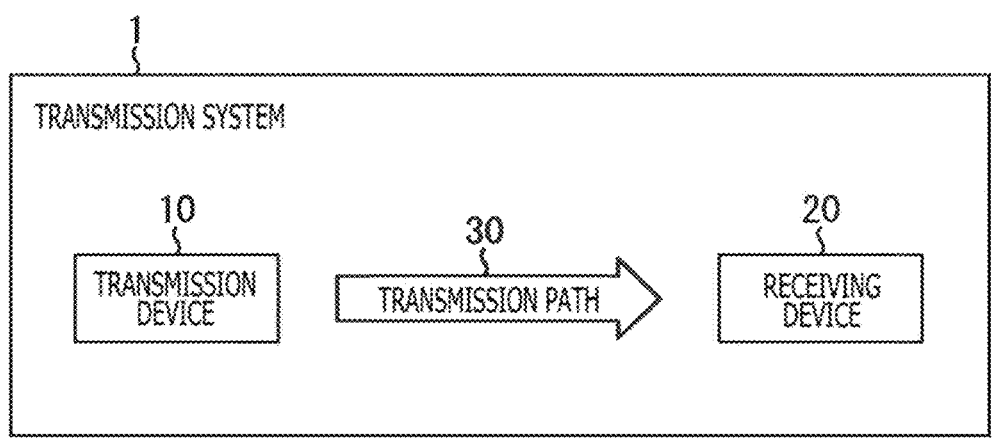
FIG. 1 is a diagram illustrating an exemplary configuration of a transmission system to which the present technology is applied.

FIG. 1 is a diagram illustrating a configuration of one embodiment of a transmission system to which the present technology is applied. Note that the "system" means a group of a plurality of devices logically gathered.

In FIG. 1, a transmission system 1 includes a transmission device 10 and a receiving device 20. This transmission system 1 performs data transmission conforming to the digital broadcasting standard employing the IP transmission method, such as ATSC 3.0.

The transmission device 10 transmits content via a transmission path 30. For example, the transmission device 10 transmits a broadcast stream as a digital broadcast signal via the transmission path 30. The broadcast stream includes (components such as) video and audio constituting the content of a television program or the like as well as signaling.

The receiving device 20 receives and outputs the content transmitted from the transmission device 10 via the transmission path 30. For example, the receiving device 20 receives the digital broadcast signal from the transmission device 10, and obtains the (components such as) video and audio constituting the content as well as the signaling from the broadcast stream. The receiving device 20 then reproduces a moving image and sound of the content of the television program or the like.

Note that although only one receiving device 20 is illustrated in the transmission system 1 in FIG. 1 for ease of description, a plurality of receiving devices 20 can be provided and digital broadcast signals transmitted by the transmission device 10 can be simultaneously received by the plurality of receiving devices 20 via the transmission path 30.

Further, the transmission path 30 in the transmission system 1 may be terrestrial broadcasting or may be, for example, satellite broadcasting using broadcasting satellites (BSs) or communications satellites (CSs), cable broadcasting using cables (CATV), or the like.
(Exemplary Configuration of Transmission Device)

Figure 2:
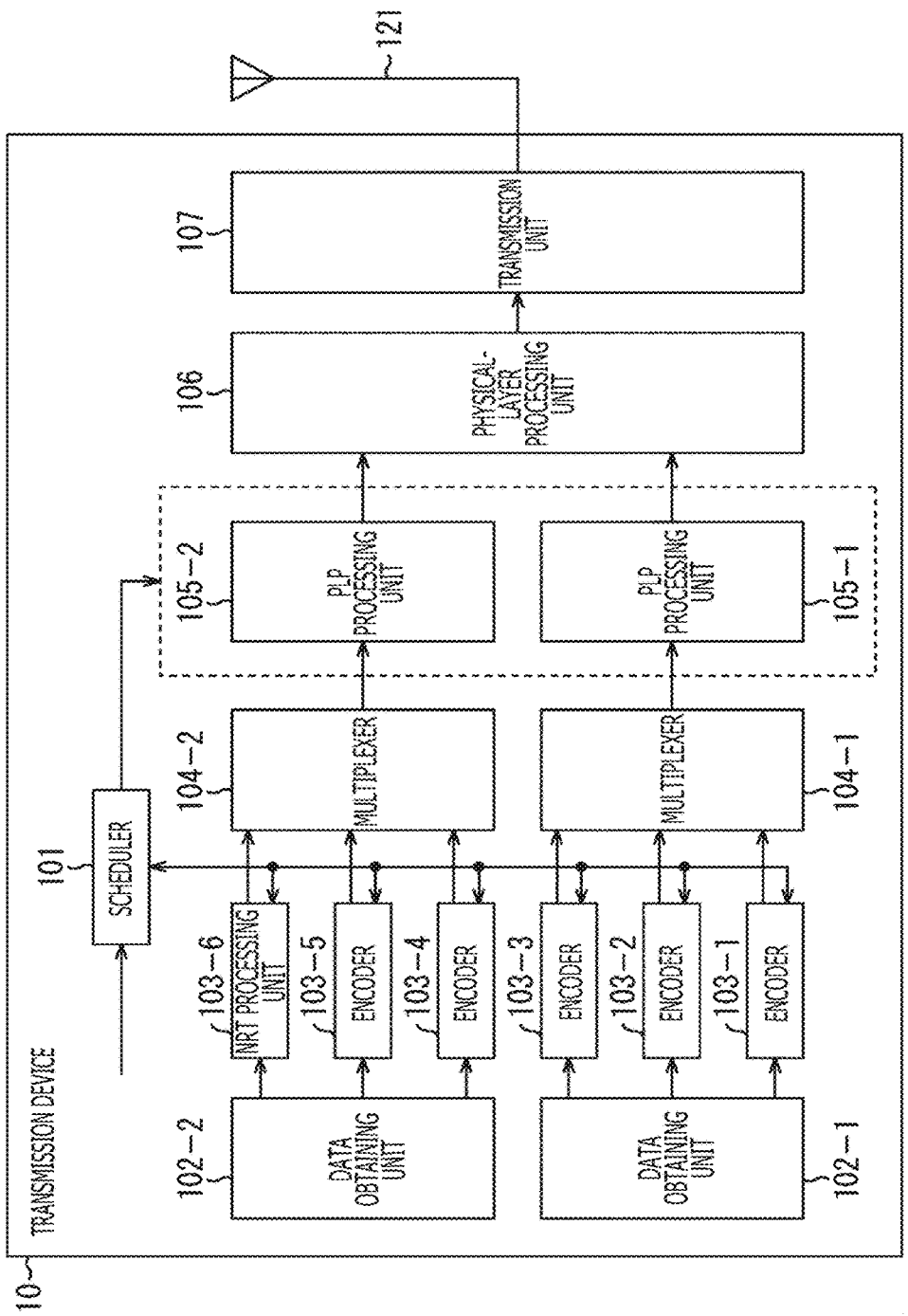
FIG. 2 is a diagram illustrating an exemplary configuration of a transmission device in FIG. 1.

FIG. 2 is a diagram illustrating an exemplary configuration of the transmission device 10 in FIG. 1.

In FIG. 2, the transmission device 10 includes a scheduler 101, a first-system processing unit, a second-system processing unit, a physical-layer processing unit 106, and a transmission unit 107. The first-system processing unit includes a data obtaining unit 102-1, encoders 103-1 to 103-3, a multiplexer 104-1, and a PLP processing unit 105-1. The second-system processing unit includes a data obtaining unit 102-2, encoders 103-4 and 103-5, an NRT processing unit 103-6, a multiplexer 104-2, and a PLP processing unit 105-2.

Note that although the transmission device 10 in FIG. 2 can perform processing so as to include a plurality of PLPs in one frequency band (e.g., a frequency band of 6 MHz corresponding to one channel (physical channel)), description will be given of the case where the transmission device 10 performs processing so as to include two PLPs, i.e., PLP#1 (e.g., a normal PLP) and PLP#2 (e.g., a robust PLP), in one frequency band for ease of description. In the transmission device 10 in FIG. 2, in other words, the processing related to the normal PLP#1 is performed by the first-system processing unit, while the processing relating to the robust PLP#2 is performed by the second-system processing unit. Note that in ATSC 3.0, up to 64 PLPs can be arranged in one frequency band.

The scheduler 101 performs processing related to the control over encoding performed by the encoder 103-1 to the NRT processing unit 103-6 and processing related to the bandwidth control over the PLPs performed by the PLP processing unit 105-1 and the PLP processing unit 105-2.

Further, physical layer information is inputted to the scheduler 101. This physical layer information includes the total number of cells and modulation parameters for each PLP. The total number of cells indicates the number of cells in an entire physical layer frame (PHY Frame).

Here, the total number of cells is a parameter that is uniquely determined when the structure of the physical layer frame (e.g., frame length) is determined. Further, a cell is one set of encoded I/Q components in a constellation.

Specifically, the physical layer frame includes a bootstrap (BS), a preamble, and a payload. ATSC 3.0 defines that the length of the bootstrap is 2 ms (=0.5 ms×4). Further, the length of the preamble and the payload can be obtained by subtracting the length of the bootstrap (2 ms) from the length of the entire physical layer frame.

Further, the preamble and the payload include data cells, L1 signaling cells, pilot cells, and Null cells. The number of these cells can be determined by modcod (e.g., a modulation method, a code length, and a code rate), which is determined for each PLP, and the modulation parameters such as an FFT size, a guard interval length, a pilot pattern, and the number of carriers, which are determined for each subframe.

The total number of cells can be obtained by using these relations. Note that the detailed structure of the subframes will be described later with reference to FIGS. 5 to 7. Further, the total number of cells in the physical layer information can be transmitted as information (L1B_L1_Detail_total_cells) included in the signaling of the physical layer.

Further, the modulation parameters include parameters such as a modulation method for each PLP (e.g., PLP#1 and PLP#2). Note that once broadcasting is started, the modulation parameters are basically fixed. This is because changing the modulation parameters changes the receivable range of the digital broadcast signal transmitted from the transmission device 10.

The data obtaining unit 102-1 obtains data of components (e.g., video, audio, and subtitles) constituting content of a television program or the like, and supplies the data to the encoder 103-1, the encoder 103-2, and the encoder 103-3.

Note that in the following description, (data of) a component to be processed by the encoder 103-1 will be referred to as a component C1, (data of) a component to be processed by the encoder 103-2 will be referred to as a component C2, and (data of) a component to be processed by the encoder 103-3 will be referred to as a component C3.

The data obtaining unit 102-2 obtains data of components (e.g., video, audio, and subtitles) constituting the content of the television program or the like, and supplies the data to the encoder 103-4, the encoder 103-5, and the NRT processing unit 103-6.

Note that in the following description, (data of) a component to be processed by the encoder 103-4 will be referred to as a component C4, (data of) a component to be processed by the encoder 103-5 will be referred to as a component C5, and (data of) a component to be processed by the NRT processing unit 103-6 will be referred to as a component C6 (NRT content).

Here, the encoder 103-1, the encoder 103-2, and the encoder 103-3, which serve as the first-system processing unit, and the encoder 103-4, the encoder 103-5, and the NRT processing unit 103-6, which serve as the second-system processing unit, supply corresponding encoding difficulty level information to the scheduler 101. The encoding difficulty level information indicates the encoding difficulty level according to the component to be processed.

That is, for example, the encoder 103-1 supplies, to the scheduler 101, the encoding difficulty level information indicating the encoding difficulty level of the component C1, such as a moving image with intense movement or a moving image close to a still image. Similarly, the encoder 103-2 to the NRT processing unit 103-6 supply, to the scheduler 101, the corresponding encoding difficulty level information regarding the component C2 to the component C6.

The scheduler 101 is supplied with the encoding difficulty level information from each of the encoder 103-1 to the NRT processing unit 103-6. On the basis of, for example, the corresponding encoding difficulty level information, the scheduler 101 determines the number of cells to be allocated to the component C1 to the component C6 (the number of cells of each component) to be transmitted by each PLP (e.g., PLP#1 and PLP#2).

Here, the number of cells is determined such that a large number of cells (code amount) is allocated to a moving image of which encoding difficulty level is high, for example, a moving image with intense movement, while a small number of cells (code amount) is allocated to a moving image of which encoding difficulty level is low, for example, a moving image close to a still image. Further, each PLP, for example, the normal PLP#1 and the robust PLP#2, has different modulation parameters. By using the modulation parameters, the code amounts (hereinafter referred to as target code amounts) of the component C1 to the component C6 to be processed by the encoder 103-1 to the NRT processing unit 103-6 can be calculated from the number of cells of each component.

The target code amounts calculated in this way are each supplied to the encoder 103-1 to the NRT processing unit 103-6.

On the basis of the target code amount supplied from the scheduler 101, the encoder 103-1 performs encoding corresponding to a given encoding method on the data of the component C1 supplied from the data obtaining unit 102-1 and supplies the data to the multiplexer 104-1. Note, however, that the data of the component C1 processed by the encoder 103-1 is processed in units of segments corresponding to the target code amount.

Here, a segment (hereinafter also referred to as segment S) is a control unit determined by a segment length T and a bandwidth W. The bit rate is constant in each segment S (constant bitrate (CBR)), and the code amount is changed in units of segments. Note that the detailed structure of the segments will be described later with reference to FIGS. 8 and 9.

Similarly, on the basis of the target code amounts supplied from the scheduler 101, the encoder 103-2 and the encoder 103-3 perform encoding on each of the data of the component C2 and the component C3 supplied from the data obtaining unit 102-1, and supply the data to the multiplexer 104-1. Note, however, that the data of the component C2 processed by the encoder 103-2 and the data of the component C3 processed by the encoder 103-3 are processed in units of segments corresponding to the respective target code amounts.

Further, on the basis of the target code amounts supplied from the scheduler 101, the encoder 103-4 to the NRT processing unit 103-6 perform encoding on each of the data of the component C4 to the component C6 supplied from the data obtaining unit 102-2, and supply the data to the multiplexer 104-2. Note, however, that the data of the component C4 processed by the encoder 103-4, the data of the component C5 processed by the encoder 103-5, and the data of the component C6 processed by the NRT processing unit 103-6 are processed in units of segments corresponding to the respective target code amounts.

That is, the scheduler 101 dynamically changes the code amounts in the segments S by variably controlling at least one of the segment length T and bandwidth W of each segment S, as the processing in units of segments corresponding to the target code amounts performed by the encoder 103-1 to the NRT processing unit 103-6.

The multiplexer 104-1 multiplexes the data of the component C1 supplied from the encoder 103-1, the data of the component C2 supplied from the encoder 103-2, and the data of the component C3 supplied from the encoder 103-3, and supplies the resultant multiplexed stream to the PLP processing unit 105-1.

The multiplexer 104-2 multiplexes the data of the component C4 supplied from the encoder 103-4, the data of the component C5 supplied from the encoder 103-5, and the data of the component C6 supplied from the NRT processing unit 103-6, and supplies the resultant multiplexed stream to the PLP processing unit 105-2.

Further, the scheduler 101 calculates the number of cells of PLP#1 and the number of cells of PLP#2 on the basis of the number of cells of the component C1 to the component C6.

Here, the total number of cells included in the physical layer information represents the number of cells in the entire physical layer frame, and the number of cells in the entire physical layer frame ($N_{total}$) is equal to the sum of the number of cells of each PLP, as indicated by the following equation (1).

[Math. 1]

$$N_{total} = \Sigma N i \quad (1)$$

Note that in the equation (1), $N_{total}$ on the left side represents the number of cells in the entire physical layer frame. Further, $N_i$ on the right side represents the number of cells of each PLP, and i represents the PLP number.

In the configuration in FIG. 2, moreover, the number of cells in the entire physical layer frame ($N_{total}$) is equal to the sum of the number of cells of PLP#1 and the number of cells of PLP#2. Therefore, the number of cells of PLP#1 and the number of cells of PLP#2 are calculated by, for example, allocating the number of cells in the entire physical layer frame to PLP#1 and PLP#2 according to the number of cells of the component C1 to the component C6.

Among the number of cells of each PLP calculated in this way, the number of cells of PLP#1 is supplied to the PLP processing unit 105-1, and the number of cells of PLP#2 is supplied to the PLP processing unit 105-2.

On the basis of the number of cells of PLP#1 supplied from the scheduler 101, the PLP processing unit 105-1 performs bandwidth control over PLP#1 by processing the multiplexed stream supplied from the multiplexer 104-1. In this way, the transmission data corresponding to the number of cells of PLP#1 is supplied to the physical-layer processing unit 106.

On the basis of the number of cells of PLP#2 supplied from the scheduler 101, the PLP processing unit 105-2 performs bandwidth control over PLP#2 by processing the multiplexed stream supplied from the multiplexer 104-2. In this way, the transmission data corresponding to the number of cells of PLP#2 is supplied to the physical-layer processing unit 106.

The physical-layer processing unit 106 generates a physical layer frame (PHY Frame) on the basis of the transmission data corresponding to the number of cells of PLP#1 supplied from the PLP processing unit 105-1 and the transmission data corresponding to the number of cells of PLP#2 supplied from the PLP processing unit 105-2. Note, however, that the number of cells in the entire physical layer frame matches the sum of the number of cells of PLP#1 and the number of cells of PLP#2. Note that the physical layer frame includes the bootstrap (BS), the preamble, and the payload, and the transmission data of PLP#1 and PLP#2 are arranged in this payload.

The physical layer frame generated by the physical-layer processing unit 106 is supplied to the transmission unit 107.

The transmission unit 107 performs IFFT (Inverse Fast Fourier Transform) on the physical layer frame supplied from the physical-layer processing unit 106 and performs D/A conversion (Digital to Analog Conversion) on the resultant OFDM (Orthogonal Frequency Division Multiplexing) signal. Then, the transmission unit 107 modulates the OFDM signal, which has been converted from the digital signal to the analog signal, into an RF (Radio Frequency) signal, and transmits the RF signal as the digital broadcast signal of the IP transmission method through an antenna 121.

The transmission device 10 is configured as described above. Note that although FIG. 2 illustrates the case where the device on the transmission side is configured by the transmission device 10, i.e., one device, for convenience of description, the device on the transmission side may be configured as a transmission system including a plurality of devices having each function of the blocks in FIG. 2.

Further, although the transmission device 10 in FIG. 2 illustrates the configuration corresponding to the two PLPs, i.e., PLP#1 and PLP#2, when one frequency band (e.g., a frequency band of 6 MHz) includes three or more PLPs, system processing units corresponding to the number of PLPs just need to be provided.

(Exemplary Configuration of Receiving Device)

Figure 3:
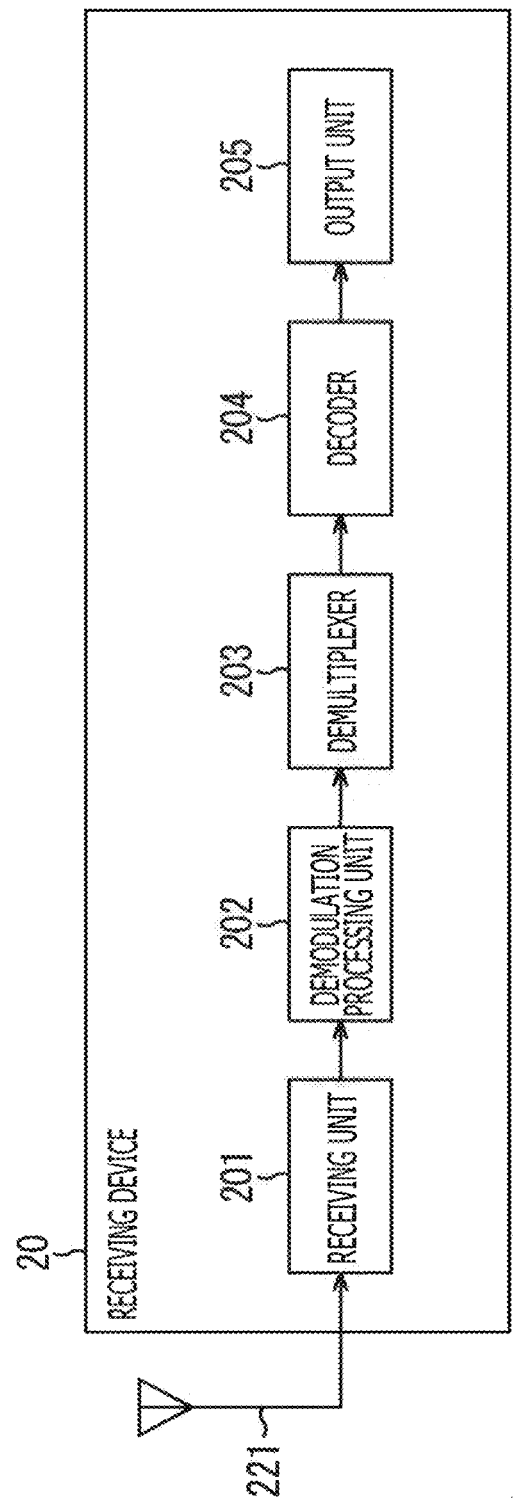
FIG. 3 is a diagram illustrating an exemplary configuration of a receiving device in FIG. 1.

FIG. 3 is a diagram illustrating an exemplary configuration of the receiving device 20 in FIG. 1.

In FIG. 3, the receiving device 20 includes a receiving unit 201, a demodulation processing unit 202, a demultiplexer 203, a decoder 204, and an output unit 205.

The receiving unit 201 receives, through an antenna 221, the digital broadcast signal of the IP transmission method transmitted from the transmission device 10 via the transmission path 30. The receiving unit 201 then performs frequency conversion from the RF signal into an IF (Intermediate Frequency) signal and supplies the signal to the demodulation processing unit 202.

The demodulation processing unit 202 performs demodulation processing (e.g., OFDM demodulation) on the signal supplied from the receiving unit 201. Further, the demodulation processing unit 202 performs error correction processing on the demodulated signal obtained by the demodulation processing, and supplies the multiplexed stream obtained as the result of the processing to the demultiplexer 203.

The demultiplexer 203 demultiplexes the multiplexed stream supplied from the demodulation processing unit 202 into data of components (video, audio, and subtitles), and supplies the data to the decoder 204.

The decoder 204 decodes the data of the components supplied from the demultiplexer 203 according to a given decoding method and supplies the data to the output unit 205.

The output unit 205 includes, for example, a display unit and a speaker. The display unit displays the moving image corresponding to the video data supplied from the decoder 204. Further, the speaker outputs sound corresponding to the audio data supplied from the decoder 204. Note that the output unit 205 may output the video and audio data supplied from the decoder 204 to external equipment.

The receiving device 20 is configured as described above. Note that the receiving device 20 may be a fixed receiver such as a television receiver, a set top box (STB), or a video recorder, or may be a mobile receiver such as a mobile phone, a smartphone, or a tablet terminal. Further, the receiving device 20 may be in-vehicle equipment mounted in a vehicle.

<2. Overview of Bandwidth Control Over PLPs to which Present Technology is Applied>

(Overview of Bandwidth Control Over PLPs)

Figure 4:
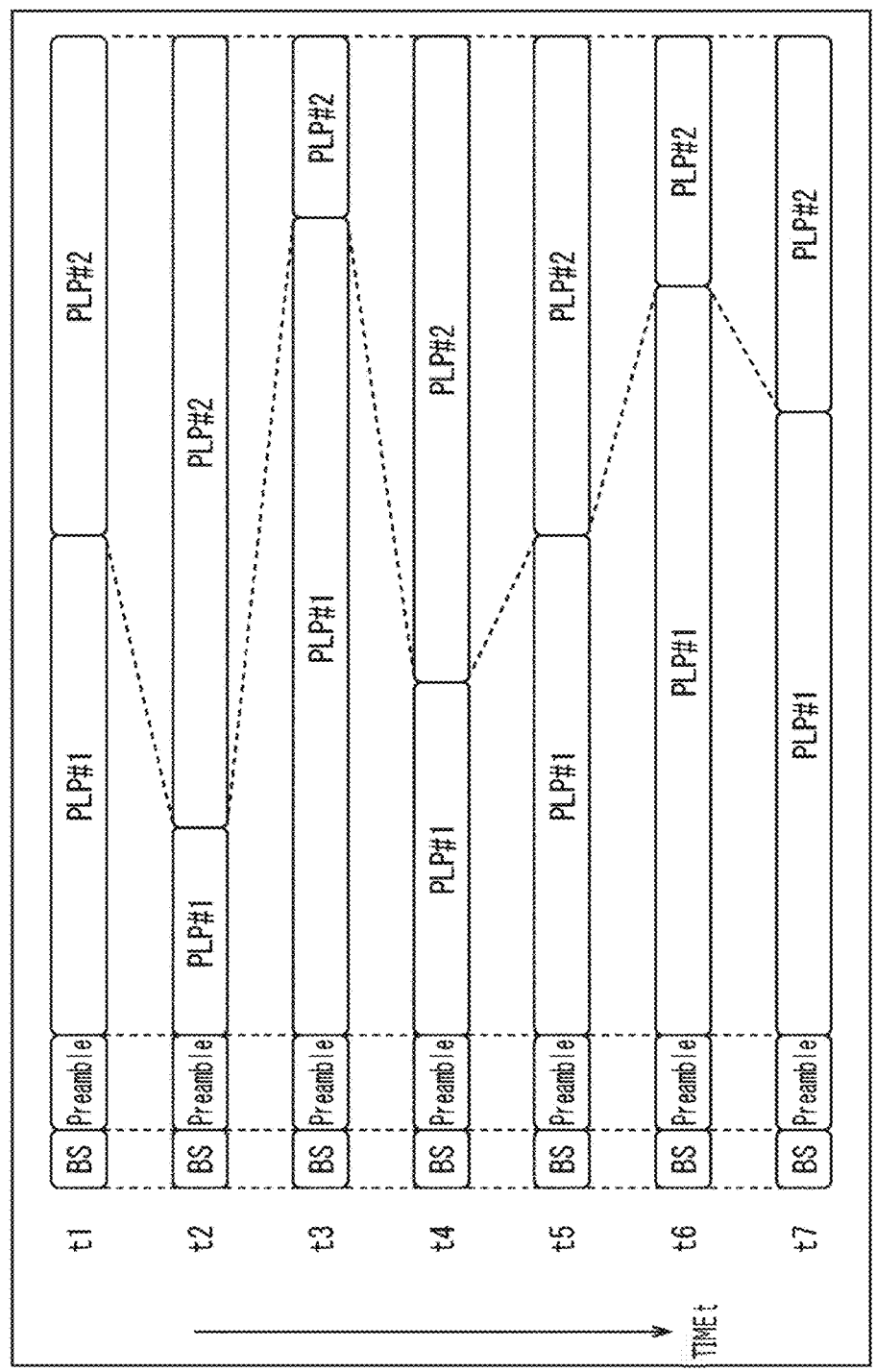
FIG. 4 is a diagram for describing an overview of bandwidth control over PLPs.

FIG. 4 is a diagram for describing the overview of the bandwidth control over the PLPs in the transmission device 10.

FIG. 4 illustrates that the PLP#1 and PLP#2 bandwidths arranged in the physical layer frame (PHY Frame) are changed through the bandwidth control over the PLPs, with the direction heading from the upper side to the lower side in the figure representing the direction of time.

Note that in FIG. 4, the physical layer frame includes the bootstrap (BS), the preamble, and the payload, and the transmission data of PLP#1 and PLP#2 are arranged in the payload. Further, since the size of the physical layer frame is determined and the number of cells in the entire physical layer frame is constant, controlling the bandwidths of the PLPs does not change the total number of cells of PLP#1 and PLP#2 but changes the ratio of the number of cells of PLP#1 to the number of cells of PLP#2. That is, the bit rates of PLP#1 and PLP#2 change according to the ratio of the number of cells.

That is, the number of cells of PLP#1 and the number of cells of PLP#2 are approximately the same in the physical layer frame at time t1. Thereafter, at time t2 after time t1, the number of cells of PLP#2 increases in the physical layer frame while the number of cells of PLP#1 decreases by the increased amount. Then, at time t3 after time t2, the number of cells of PLP#1 contrarily increases while the number of cells of PLP#2 decreases by the increased amount.

Thereafter, similarly at time t4 to time t7, when the number of cells of PLP#1 increases in the physical layer frame, the number of cells of PLP#2 decreases accordingly, while when the number of cells of PLP#2 increases, the number of cells of PLP#1 decreases accordingly.

In this way, the bandwidth control over the PLPs is performed by changing the number of cells of PLP#1 and the number of cells of PLP#2 on the assumption that the number of cells in the entire physical layer frame is constant.

Figure 5:
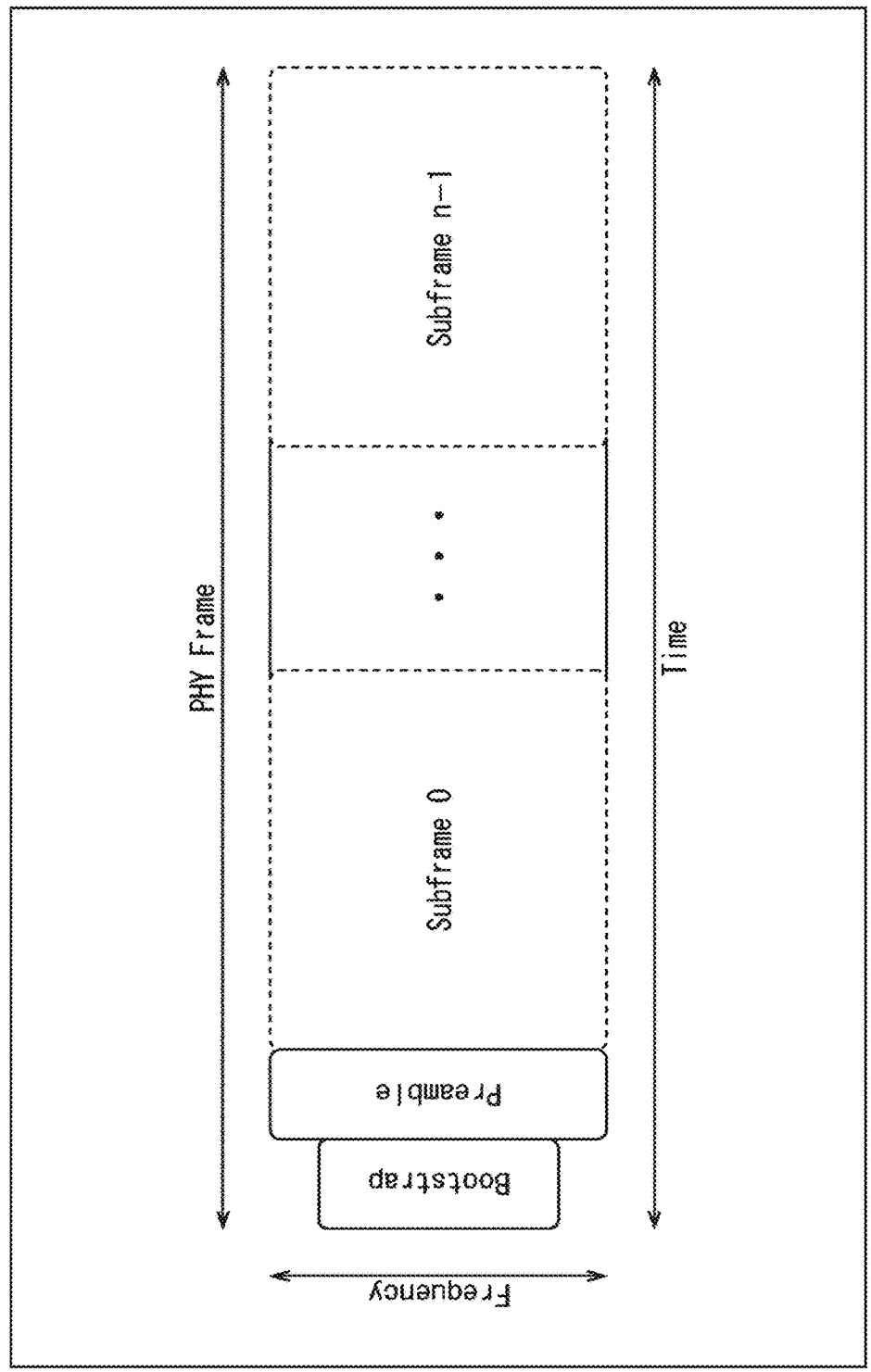
FIG. 5 is a diagram illustrating a structure of a physical layer frame.

Note that in practice, the physical layer frame includes the bootstrap (BS), the preamble, and one or more subframes as illustrated in FIG. 5, and the data of one or a plurality of PLPs (e.g., PLP#1 and PLP#2) are arranged in this subframe.

Here, parameters that can be changed for each subframe are the parameters as illustrated in FIG. 6, such as, for example, the FFT size (L1D_fft_size), the guard interval length (L1D_guard_interval), or the pilot pattern (L1D_scattered_pilot_pattern). Further, parameters that can be changed for each PLP are the parameters as illustrated in FIG. 7, such as the code length (L1D_plp_fec_type), the modulation method (L1D_plp_mod), or the code rate (L1D_plp_cod).

(Structure of Segment)

Figure 8:
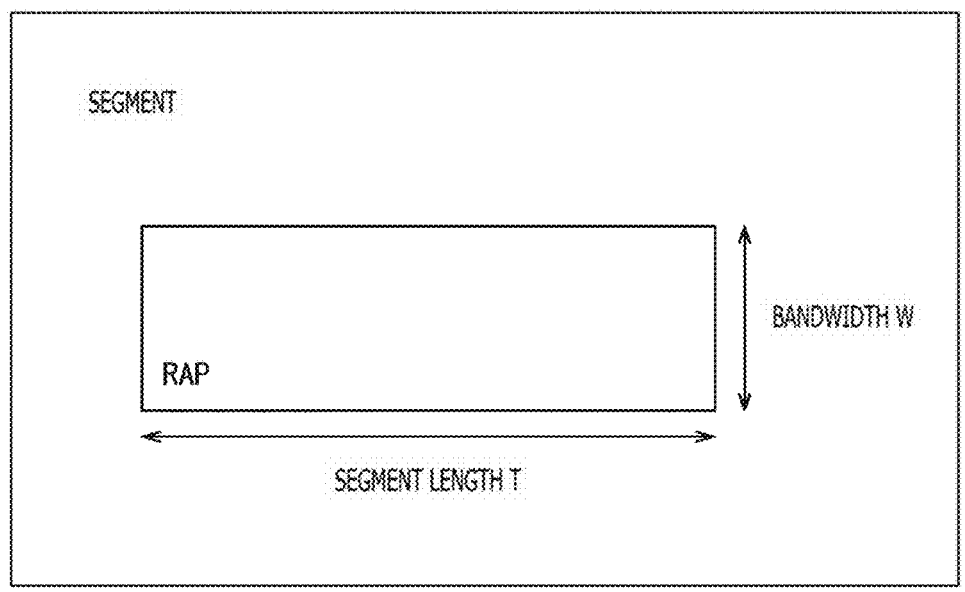
FIG. 8 is a diagram illustrating a segment control unit.

FIG. 8 is a diagram illustrating the structure of the segment S.

The segment S is a control unit determined by the segment length T and the bandwidth W. The bit rate is constant within this segment S, and the code amount is changed in units of segments.

Here, each segment S starts from a RAP (Random Access Point). RAP indicates the position of a frame that can obtain one complete image only with this frame, such as, for example, an I frame in a GOP (Group of Pictures).

Further, when a scene change occurs, the I frame is inserted. In the segment S, as a result, there exist two I frames of which generated code amount is large. Since only half of the generated code amount can be allocated to each I frame when the bandwidth is constant, this results in the deterioration of the image quality. Note, however, that the scene change occurs at the time when there is no correlation between a frame of interest, which is the current interest, and the preceding frame, which is temporally continuous with the frame of interest.

In the present technology, therefore, when the scene change occurs, the segment S is processed using a segment bandwidth change method or a segment division method so as to be able to minimize the deterioration of the image quality resulting from the insertion of the I frame at the occurrence of the scene change.

Specifically, as illustrated in A of FIG. 9, the segment S processing using the segment bandwidth change method widens the bandwidth W of the segment S up to bandwidth W' when the scene change occurs. This increases the bandwidth within the segment S (temporarily). In this case, even when an I frame or a P frame is inserted, it is possible to minimize the deterioration of the image quality at the occurrence of the scene change because of the bandwidth being increased within the segment S. Other than the scene change, moreover, when any previously unpredictable change in the generated code amount occurs, the bandwidth can be increased or decreased in a similar way.

Further, as illustrated in B of FIG. 9, when the scene change occurs, the segment S processing using the segment division method terminates the target segment S at this point and starts a new segment S. In this case, even in the middle of the processing of a GOP in the target segment S, the processing of this GOP is forcibly terminated (terminated at segment length T' (T'<T)) and processing of a new GOP is restarted in the new segment S. Then, processing of the I frame at the head is performed in the new segment S, for example.

In this way, when the scene change occurs, the target segment S is terminated even in the middle of the predetermined segment length, and the new segment S is started (that is, by dividing the segment S). As a result, for example, the two I frames do not exist in the segment S and the deterioration of the image quality at the occurrence of the scene change can be minimized. Other than the scene change, moreover, when any previously unpredictable increase in the generated code amount occurs, a new segment S can be started in a similar way.

In the present technology, as described above, processing is basically performed in units of segments. However, in a situation where the normal processing in units of segments is not applicable (e.g., a situation where bandwidth needs to be increased), such as, for example, at the time when a scene change occurs, the segment S is exceptionally processed according to a predetermined method such as the segment bandwidth change method, the segment division method, or the like.

Note that in the case of employing a hierarchical encoding technology, there is an advantage that decoding and synchronization processing are facilitated with the components of different layers having the same segment length T.

(Data Control Using NRT Content)

Figure 10:
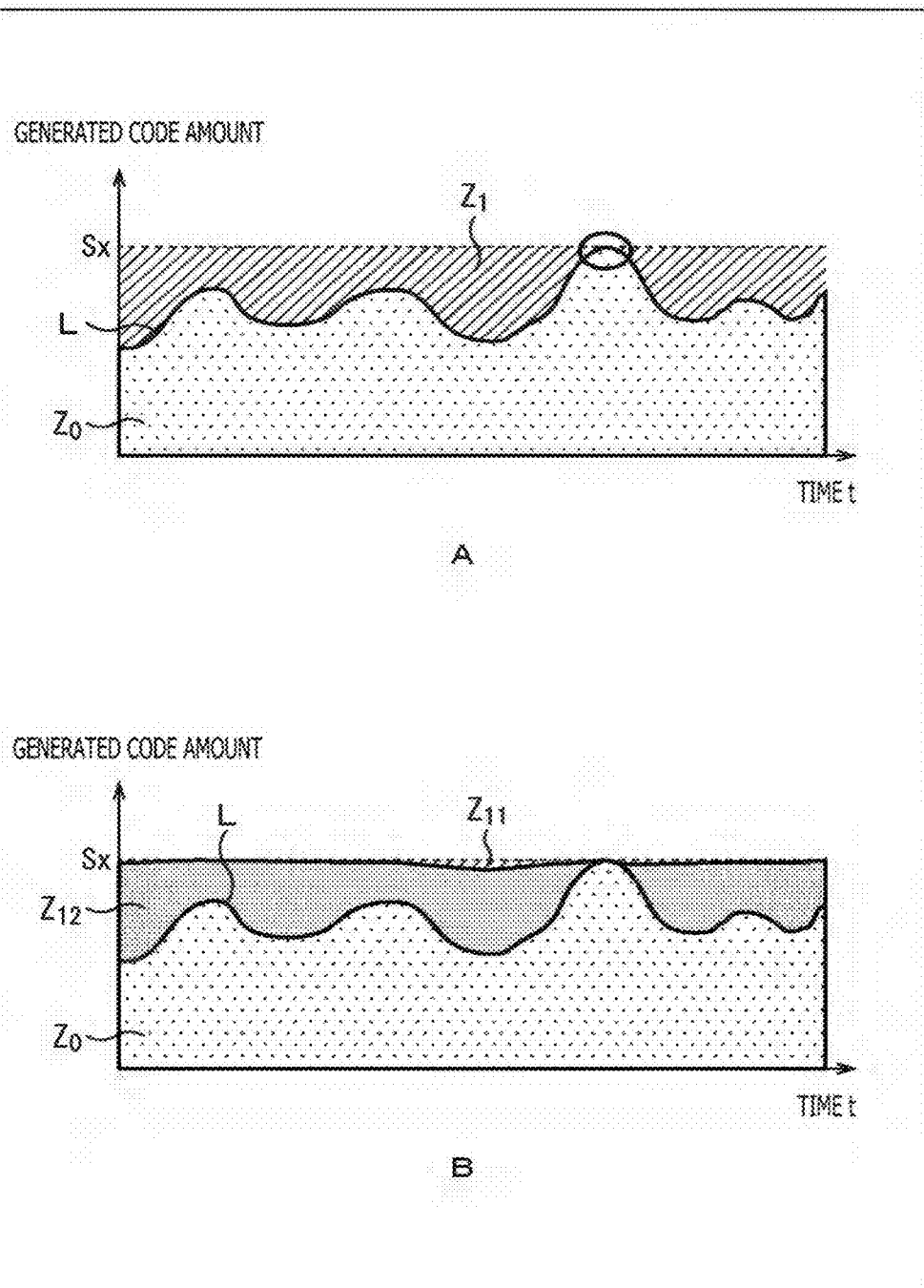
FIG. 10 is a diagram for describing data control using NRT content.

FIG. 10 is a diagram for describing data control using the NRT content.

Incidentally, the bandwidth of the physical layer (PHY) conforming to the general broadcasting standard is a fixed bit rate. In order to achieve this, data encoding is controlled such that the quality (mainly image quality) of each content is optimized within a range in which the generated code amount of the data of components (video and audio) constituting the content of a television program or the like does not exceed the fixed bit rate of the physical layer.

At this time, Null packets are inserted into portions that are insufficient for the fixed bit rate so that the portions are adjusted to the fixed bit rate. In the physical layer, moreover, the generated code amount is reduced using a header compression technology or a variable length header technology, for example. However, when the generated code amount is insufficient for the fixed bit rate, Null packets are inserted.

Such a situation is illustrated in A of FIG. 10. A waveform L in A of FIG. 10 illustrates a relation of the generated code amount of the digital broadcasting conforming to a general broadcasting standard to the elapse of time t. The generated code amount is in the vertical axis, and the elapse of time t is in the horizontal axis. The area in a range $Z_0$ equal to or less than the waveform L is the total generated code amount. That is, with a generated code amount Sx as the maximum value, the generated code amount changes as indicated by the waveform L. The generated code amount Sx is the fixed bit rate in the physical layer.

However, since transmission needs to be performed at the fixed bit rate in the physical layer and the code amount becomes insufficient at the timing other than the timing of the generated code amount Sx, which is the maximum value of the waveform L, Null packets are inserted. That is, at the timing other than the generated code amount Sx, which is the maximum value, a range $Z_1$ is the code amount of invalid data, i.e., Null packets, as illustrated in A of FIG. 10. The range $Z_1$ is equal to or greater than the waveform L and smaller than the maximum value of the generated code amount Sx.

Nevertheless, ATSC 3.0 requires effective use of the limited bandwidth. Since Null packets, which are invalid data, may cause a reduction in the transmission efficiency, it is desirable that the Null packets are not used. Therefore, transmission efficiency can be improved by transmitting not only real time (RT) data such as the components C but also the data of the NRT content that is of non real time (NRT).

That is, at the timing other than the generated code amount Sx, which is the maximum value, a range $Z_{12}$ is the code amount of the data of the NRT content instead of the Null packets, as illustrated in B of FIG. 10. The range $Z_{12}$ is the range between the waveform L and the maximum value of the generated code amount Sx.

Note, however, that there are cases where it is not possible to include the data of the NRT content that completely corresponds to the code amount of the Null packets. Therefore, a range $Z_{11}$ above the range $Z_{12}$ is the code amount of the reduced Null packets. In this way, the range $Z_0$ and the range $Z_{12}$ become valid packets to be transmitted. As a result, almost the entire range of the generated code amount Sx, which is the maximum value of the fixed bit rate, can be used up, and therefore the transmission efficiency can be improved.

In the present technology, moreover, paying attention to the fact that the NRT content (component C6) is non-real-time data, the bandwidth of the data of the NRT content (component C6) is made to vary freely. That is, the bandwidth of the NRT content (component C6) is controlled depending on the generated code amounts of the data of the other components (components C1 to C5) which are real-time data, so that the bandwidths of the other components (components C1 to C5) are preferentially secured.

In this way, by using the bandwidth of the NRT content (component C6) as, so to speak, a margin, the real-time bandwidth control can be facilitated more. Note that since the NRT content (component C6) is non-real-time data, no problem occurs even when the bandwidth thereof is temporarily set to 0 (zero), for example.

Note that the inventor of the present application has already proposed the method for transmitting the data of the NRT content instead of Null packets in Japanese Patent Application No. 2014-127064.

<3. Specific Examples of Bandwidth Control>
(List of Bandwidth Control Methods)

FIG. 11 is a diagram illustrating a list of bandwidth control methods of the present technology.

The bandwidth control methods of the present technology are determined by a combination of the bandwidth W and the segment length T of the segment S in each component, the segment switching time, and handling at the occurrence of the scene change.

Here, the bandwidth W of each segment S comes in two types, i.e., "constant" and "variable." "Constant" indicates that the width of the bandwidth W of the segment S of each component is constant, while "variable" indicates that the width of the bandwidth W of the segment S of each component changes with time.

Further, the segment length T comes in two types, i.e., "constant" and "constant/variable." "Constant" indicates that the segment length T of the segment S of each component is constant, while "constant/variable" indicates that the segment length T of the segment S of each component is constant or changes with time.

Further, the segment switching time comes in two types, i.e., "simultaneous" and "individual." "Simultaneous" indicates that the time at which the segment S of each component is switched is the same, while "individual" indicates that the time at which the segment S of each component is switched varies. Note, however, that the types of the segment length T and the types of the segment switching time correlate with each other; the segment switching time is "simultaneous" when the segment length T is "constant," while the segment switching time is "individual" when the segment length T is "constant/variable."

Further, the handling at the occurrence of the scene change comes in two types, i.e., "segment bandwidth change method" and "segment division method." The "segment bandwidth change method" indicates that the handling at the occurrence of the scene change of each component is done by the segment bandwidth change method (A of FIG. 9). The "segment division method" indicates that the handling at the occurrence of the scene change of each component is done by the segment division method (B of FIG. 9). Note that in the table in FIG. 11, the cases where the handling at the occurrence of the scene change is not specifically determined are denoted by "–."

In the table in FIG. 11, eight bandwidth control methods are determined depending on the combinations of these types.

In a bandwidth control method 1, control is performed such that the bandwidth W is "constant," the segment length T is "constant," and the segment switching time is "simultaneous."

A bandwidth control method 2 and a bandwidth control method 2B have in common with each other, in that the control is performed such that the bandwidth W is "constant," the segment length T is "constant/variable," and the segment switching time is "individual." On the other hand, the difference is that only in the bandwidth control method 2B, the control is performed such that the handling at the occurrence of the scene change is done by the "segment division method."

A bandwidth control method 3 and a bandwidth control method 3A have in common with each other, in that the control is performed such that the bandwidth W is "variable," the segment length T is "constant," and the segment switching time is "simultaneous." On the other hand, the difference is that only in the bandwidth control method 3A, the control is performed such that the handling at the occurrence of the scene change is done by the "segment bandwidth change method."

A bandwidth control method 4, a bandwidth control method 4A, and a bandwidth control method 4B have in common with each other, in that the control is performed such that the bandwidth W is "variable," the segment length T is "constant/variable," and the segment switching time is "individual." On the other hand, the difference is that in the bandwidth control method 4A, the control is performed such that the handling at the occurrence of the scene change is done by the "segment bandwidth change method," while in the bandwidth control method 4B, the control is performed such that the handling at the occurrence of the scene change is done by the "segment division method."

The specific examples of each bandwidth control method illustrated in the table in FIG. 11 will be described below in order.

(1) Bandwidth Control Method 1

Figure 12:
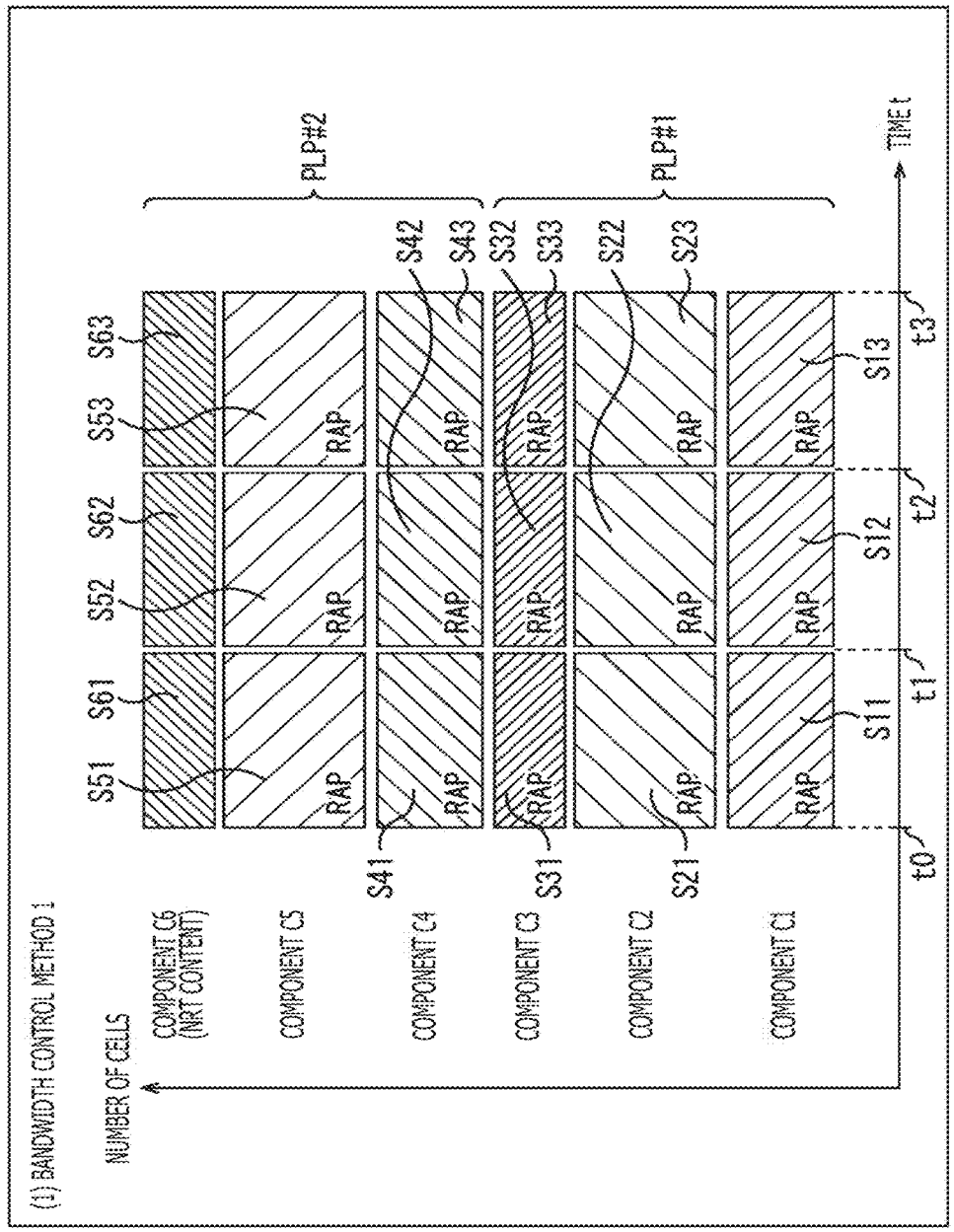
FIG. 12 is a diagram for describing bandwidth control when a bandwidth control method 1 is employed.

FIG. 12 is a diagram for describing the bandwidth control when the bandwidth control method 1 is employed.

Figure 13:
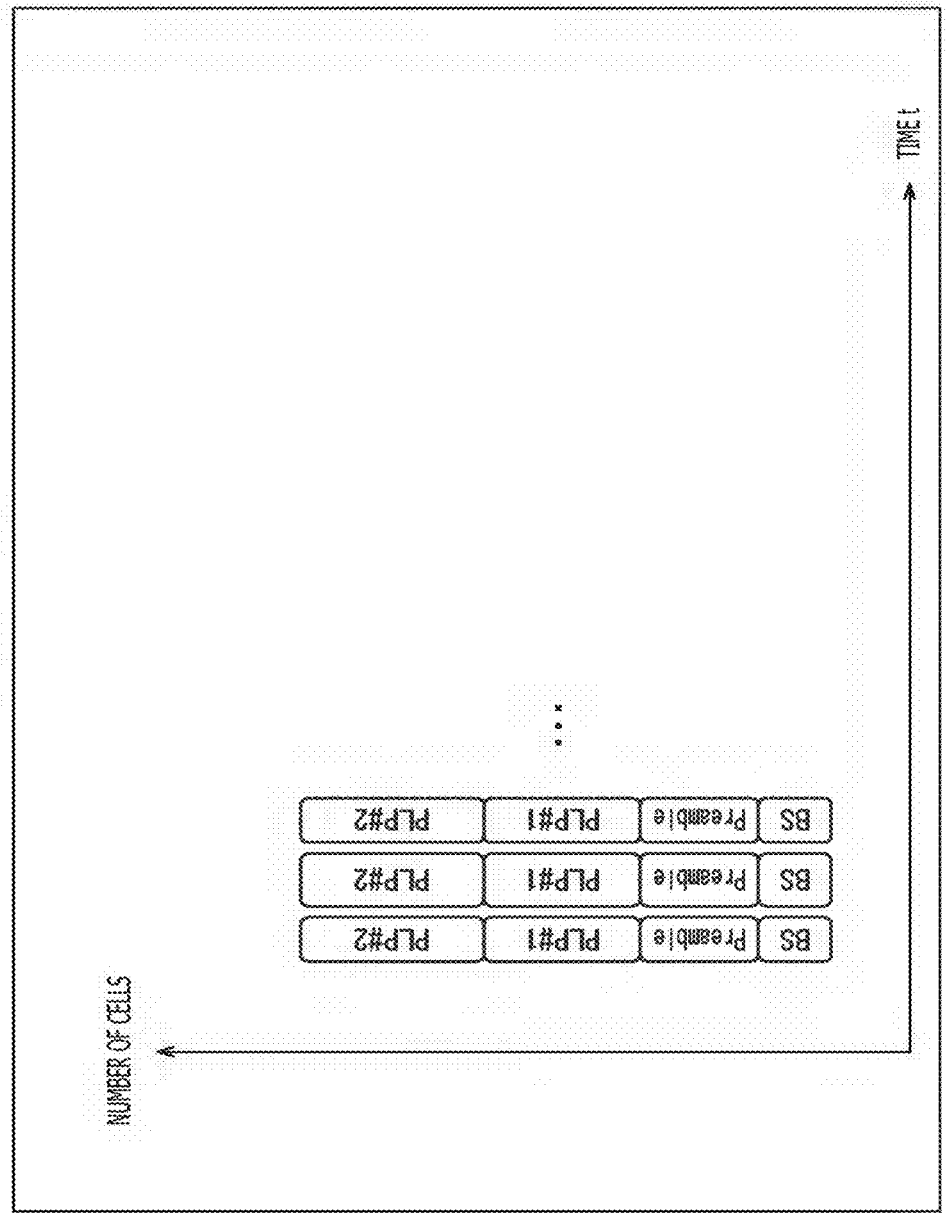
FIG. 13 is a diagram illustrating a relation between transmission data and the physical layer frame.

In FIG. 12, the horizontal axis represents time t, and the direction heading from the left side to the right side in the figure represents the direction of time. Further, the vertical axis represents the number of cells (No of Cells), indicating that the higher the position in the figure, the greater the number of cells. That is, the relation between the time axis and the number of cells in FIG. 12, which is represented by the physical layer frame, can be represented as illustrated in FIG. 13.

Referring back to the description in FIG. 12, the component C1 to the component C6 correspond to the component C1 to the component C6 processed by the encoder 103-1 to the NRT processing unit 103-6 in FIG. 2.

That is, the component C1 represents the component processed by the encoder 103-1 (FIG. 2), and a segment S11, a segment S12, a segment S13, . . . , and a segment S1t (t is an integer equal to or greater than 1) are processed in sequence as the segments S of this component C1.

Similarly, the component C2 to the component C5 represent the components processed by the encoder 103-2 to the encoder 103-5 (FIG. 2). Then, a segment S21, . . . , and an S2t (t is an integer equal to or greater than 1) are processed in sequence as the segments S of the component C2, and a segment S31, . . . , and a segment S3t (t is an integer equal to or greater than 1) are processed in sequence as the segments S of the component C3. Further, a segment S41, . . . , and an S4t (t is an integer equal to or greater than 1) are processed in sequence as the segments S of the component C4, and a segment S51, . . . , and an S5t (t is an integer equal to or greater than 1) are processed in sequence as the segments S of the component C5.

Further, the component C6 represents the NRT content processed by the NRT processing unit 103-6 (FIG. 2), and a segment S61, . . . , and an S6t (t is an integer equal to or greater than 1) are processed in sequence as the segments S of this component C6 (NRT content).

Note that in the following description, the components C1 to C6 will be referred to as a component C when it is not necessary to particularly distinguish among them. Further, the segments S11 to S1t, the segments S21 to S2t, the segments S31 to S3t, the segments S41 to S4t, the segments S51 to S5t, and the segments S61 to S6t will be referred to as a segment S when it is not necessary to particularly distinguish among them. Further, the relation among them is also similar in FIGS. 14 to 20 to be described later.

Here, in the bandwidth control method 1 in FIG. 12, the scheduler 101 (FIG. 2) performs control such that the bandwidth W and the segment length T of the segment S are "constant" and the segment switching time is "simultaneous." That is, in the bandwidth control method 1, the bandwidth W and the segment length T of each segment S are "constant." In each component C, therefore, the width in the vertical-axis direction and the width in the horizontal-axis direction are the same in the region of each segment S determined by the bandwidth W and the segment length T (the region having a pattern that is different per segments of each component in the figure).

Further, since the segment switching time is "simultaneous" in the bandwidth control method 1, the segment S switching time in each component C is repeated every fixed period.

For example, paying attention to each segment S of the component C1, the segment S11 starting at time t0 switches to the segment S12 at time t1, the segment S12 starting at time t1 switches to the segment S13 at time t2, and the segment S13 starting at time t2 switches to the segment S14 at time t3. At this time, moreover, the bandwidth of each segment S in the component C1 is constant.

Note, however, that in FIG. 12, the period from time t0 to time t1, the period from time t1 to time t2, and the period from time t2 to time t3 are the same period. Note that although FIG. 12 illustrates the period from time t0 to time t3 for convenience of description, the switch between the temporally continuous preceding and succeeding segments (e.g., the segment S14 and the segment S15) in the component C1 is also performed in sequence every fixed period in the following periods.

Similarly, paying attention to each segment S of the component C2, the switch between the temporally continuous preceding and succeeding segments S (e.g., the segment S21 and the segment S22, the segment S22 and the segment S23) is performed in sequence at each time t (e.g., time t1 and time t2) every fixed period. At this time, moreover, the bandwidth of each segment S in the component C2 is constant.

Similarly, paying attention to each segment S of the component C3, the switch between the temporally continuous preceding and succeeding segments S (e.g., the segment S31 and the segment S32, the segment S32 and the segment S33) is performed in sequence at each time t (e.g., time t1 and time t2) every fixed period. At this time, moreover, the bandwidth of each segment S in the component C3 is constant.

Then, the respective segments S in the component C1 to the component C3 processed by the encoder 103-1 to the encoder 103-3 are multiplexed by the multiplexer 104-1, and the resultant multiplexed stream is processed as PLP#1 by the PLP processing unit 105-1.

Further, paying attention to each segment S of the component C4, the switch between the temporally continuous preceding and succeeding segments S (e.g., the segment S41 and the segment S42, the segment S42 and the segment S43) is performed in sequence at each time t (e.g., time t1 and time t2) every fixed period. At this time, moreover, the bandwidth of each segment S in the component C4 is constant.

Similarly, paying attention to each segment S of the component C5, the switch between the temporally continuous preceding and succeeding segments S (e.g., the segment S51 and the segment S52, the segment S52 and the segment S53) is performed in sequence at each time t (e.g., time t1 and time t2) every fixed period. At this time, moreover, the bandwidth of each segment S in the component C5 is constant.

Similarly, paying attention to each segment of the component C6 (NRT content), the switch between the temporally continuous preceding and succeeding segments S (e.g., the segment S61 and the segment S62, the segment S62 and the segment S63) is performed in sequence at each time t (e.g., time t1 and time t2) every fixed period. At this time, moreover, the bandwidth of each segment S in the component C6 is constant.

Then, the respective segments S in the component C4 to the component C6 processed by the encoder 103-4 to the NRT processing unit 103-6 are multiplexed by the multiplexer 104-2, and the resultant multiplexed stream is processed as PLP#2 by the PLP processing unit 105-2.

As described above, in the bandwidth control method 1 in FIG. 12, the switch between the temporally continuous segments S in each component C is performed simultaneously at each time t (e.g., time t1 and time t2) every fixed period.

Specifically, for example, at time t1, the switches between the segment S11 and the segment S12 of the component C1, between the segment S21 and the segment S22 of the component C2, between the segment S31 and the segment S32 of the component C3, between the segment S41 and the segment S42 of the component C4, between the segment S51 and the segment S52 of the component C5, and between the segment S61 and the segment S62 of the component C6 are performed simultaneously.

Further, for example, at time t2, the switches between the segment S12 and the segment S13 of the component C1, between the segment S22 and the segment S23 of the component C2, between the segment S32 and the segment S33 of the component C3, between the segment S42 and the segment S43 of the component C4, between the segment S52 and the segment S53 of the component C5, and between the segment S62 and the segment S63 of the component C6 are performed simultaneously.

The bandwidth control when the bandwidth control method 1 is employed has been described above.

(2) Bandwidth Control Method 2

Figure 14:
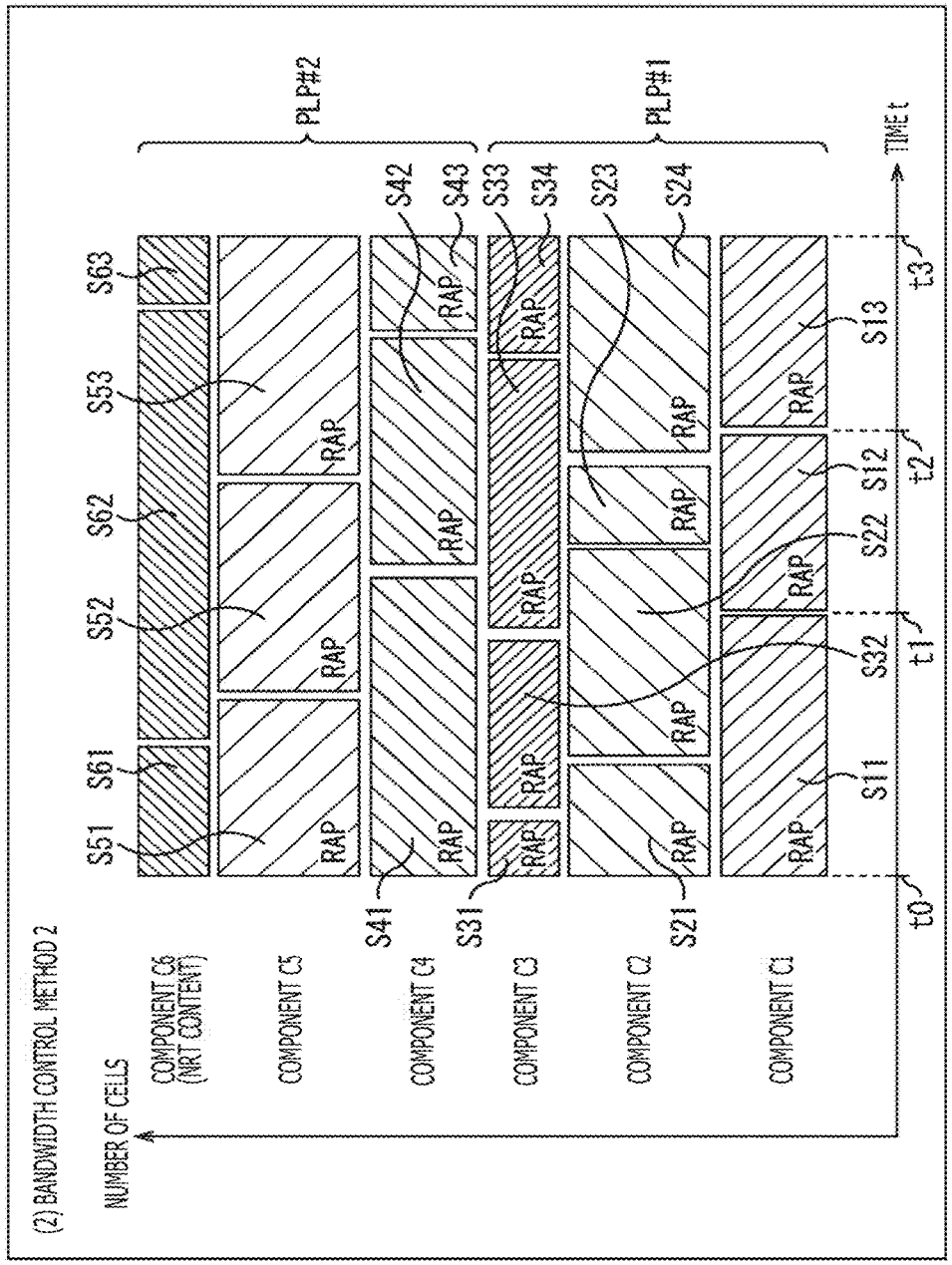
FIG. 14 is a diagram for describing bandwidth control when a bandwidth control method 2 is employed.

FIG. 14 is a diagram for describing the bandwidth control when the bandwidth control method 2 is employed.

Here, in the bandwidth control method 2 in FIG. 14, the scheduler 101 (FIG. 2) performs control such that the bandwidth W is "constant," the segment length T is "constant/variable," and the segment switching time is "individual." That is, in the bandwidth control method 2, the bandwidth W of each segment S is "constant" while the segment length T thereof is "constant/variable." In each component C, therefore, the region of each segment S determined by the bandwidth W and the segment length T (the region having a pattern that is different per segments of each component in the figure) has the same width in the vertical-axis direction but a different width in the horizontal-axis direction.

Further, since the segment switching time is "individual" in the bandwidth control method 2, the segment S switching time in each component C is not a fixed period.

For example, paying attention to each segment S of the component C1, the switch between the temporally continuous preceding and succeeding segments S (e.g., the segment S11 and the segment S12, the segment S12 and the segment S13) is performed in sequence at each time t (e.g., time t1 and time t2) every variable period. At this time, moreover, the bandwidth of each segment S in the component C1 is constant.

Similarly, paying attention to each segment S of the component C2, the switch between the temporally continuous preceding and succeeding segments S (e.g., the segment S21 and the segment S22, the segment S22 and the segment S23, the segment S23 and the segment S24) is performed in sequence at each time t (e.g., time other than time t1 and time t2) every variable period. At this time, moreover, the bandwidth of each segment S in the component C2 is constant.

Similarly, paying attention to each segment S of the component C3, the switch between the temporally continuous preceding and succeeding segments S (e.g., the segment S31 and the segment S32, the segment S32 and the segment S33, the segment S33 and the segment S34) is performed in sequence at each time t (e.g., time other than time t1 and time t2) every variable period. At this time, moreover, the bandwidth of each segment S in the component C3 is constant.

Then, the respective segments S in the component C1 to the component C3 processed by the encoder 1C3-1 to the encoder 103-3 are multiplexed by the multiplexer 104-1, and the resultant multiplexed stream is processed as PLP#1 by the PLP processing unit 105-1.

Further, paying attention to each segment S of the component C4, the switch between the temporally continuous preceding and succeeding segments S (e.g., the segment S41 and the segment S42, the segment S42 and the segment S43) is performed in sequence at each time t (e.g., time other than time t1 and time t2) every variable period. At this time, moreover, the bandwidth of each segment S in the component C4 is constant.

Similarly, paying attention to each segment S of the component C5, the switch between the temporally continuous preceding and succeeding segments S (e.g., the segment S51 and the segment S52, the segment S52 and the segment S53) is performed in sequence at each time t (e.g., time other than time t1 and time t2) every variable period. At this time, moreover, the bandwidth of each segment S in the component C5 is constant.

Similarly, paying attention to each segment of the component C6 (NRT content), the switch between the temporally continuous preceding and succeeding segments S (e.g., the segment S61 and the segment S62, the segment S62 and the segment S63) is performed in sequence at each time t (e.g., time other than time t1 and time t2) every variable period. At this time, moreover, the bandwidth of each segment S in the component C6 is constant.

Then, the respective segments S in the component C4 to the component C6 processed by the encoder 1C3-4 to the NRT processing unit 103-6 are multiplexed by the multiplexer 104-2, and the resultant multiplexed stream is processed as PLP#2 by the PLP processing unit 105-2.

As described above, in the bandwidth control method 2 in FIG. 14, the switch between the temporally continuous segments S in each component C is not performed simultaneously but performed at each time t (e.g., time t1 and time t2) every variable period.

Specifically, for example, the switch between the segment S11 and the segment S12 in the component C1 is performed at time t1, but the switch between the segments S is not performed in the component C2 to the component C6 at this time. Further, for example, the switch between the segment S12 and the segment S13 in the component C1 is performed at time t2, but the switch between the segments S is not performed in the component C2 to the component C6 at this time.

Note that although everything will not be described to avoid repetition, the component C2 to the component C6 are also similar. When the switch between its own segments S is performed, there is no switch between other segments S in the other components C at this timing.

The bandwidth control when the bandwidth control method 2 is employed has been described above.

(3) Bandwidth Control Method 2B

Figure 15:
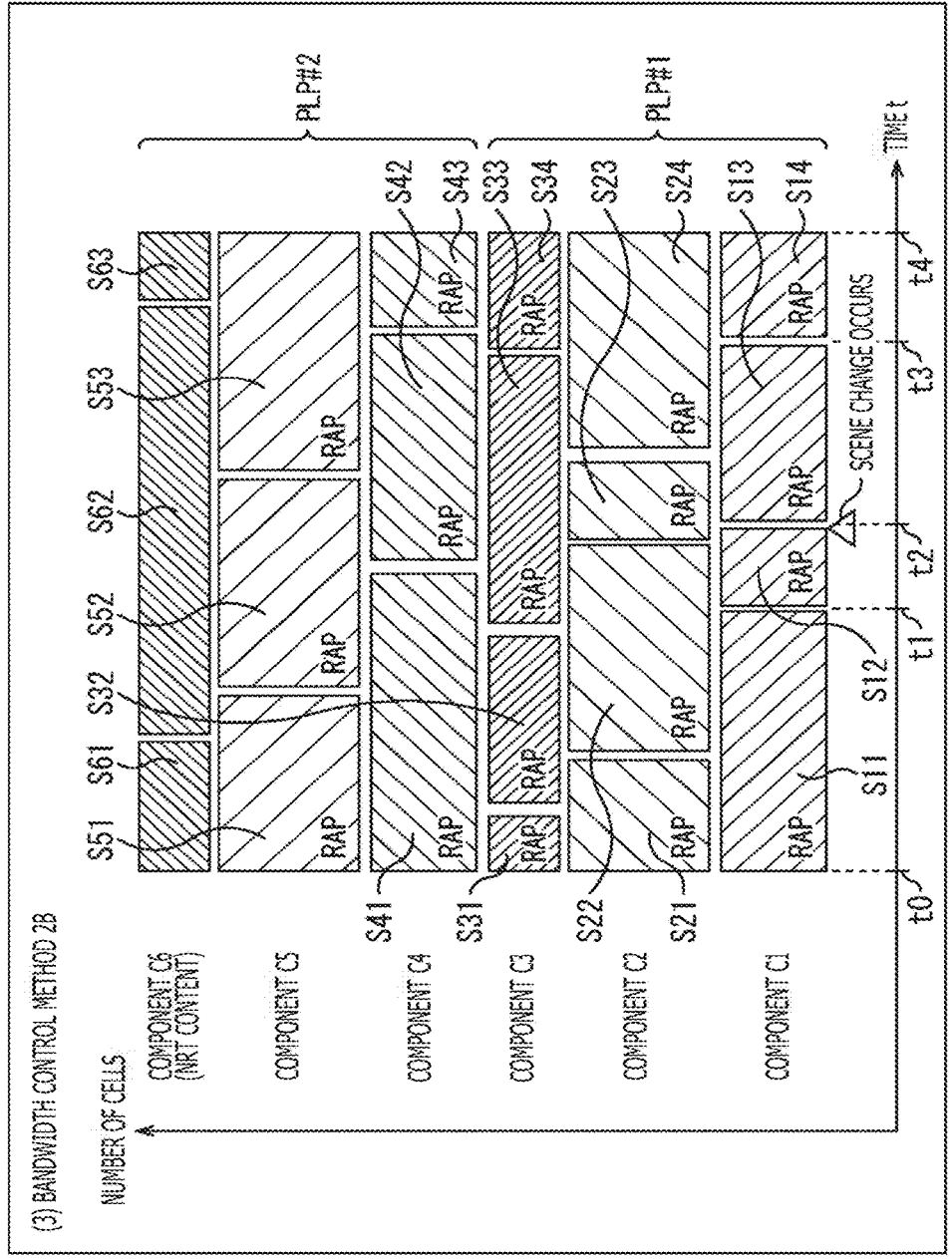
FIG. 15 is a diagram for describing bandwidth control when a bandwidth control method 2B is employed.

FIG. 15 is a diagram for describing the bandwidth control when the bandwidth control method 2B is employed.

The bandwidth control method 2B in FIG. 15 has in common with the bandwidth control method 2 (FIG. 14) in that the scheduler 101 (FIG. 2) performs control such that the bandwidth W is "constant," the segment length T is "constant/variable," and the segment switching time is "individual." On the other hand, the bandwidth control method 2B is different from the bandwidth control method 2 (FIG. 14) in that when the scene change occurs, processing is performed using the segment division method. This point will be mainly described below.

That is, in the bandwidth control method 2B, the bandwidth W of each segment S is "constant" while the segment length T thereof is "constant/variable." In each component C, therefore, the region of each segment S determined by the bandwidth W and the segment length T (the region having a pattern that is different per segments of each component in the figure) has the same width in the vertical-axis direction but a different width in the horizontal-axis direction. Further, since the segment switching time is "individual" in the bandwidth control method 2B, the segment S switching time in each component C is not a fixed period.

Here, paying attention to each segment S of the component C1, when the scene change occurs at time t2 at which the segment S12 is being processed, the segment S12 is forcibly terminated at this point even in the middle of the predetermined segment length and the processing of the new segment S13 is started according to the segment division method. This can minimize the deterioration of the image quality at the occurrence of the scene change without two I frames existing in the segment S, for example.

The bandwidth control when the bandwidth control method 2B is employed has been described above.

(4) Bandwidth Control Method 3

Figure 16:
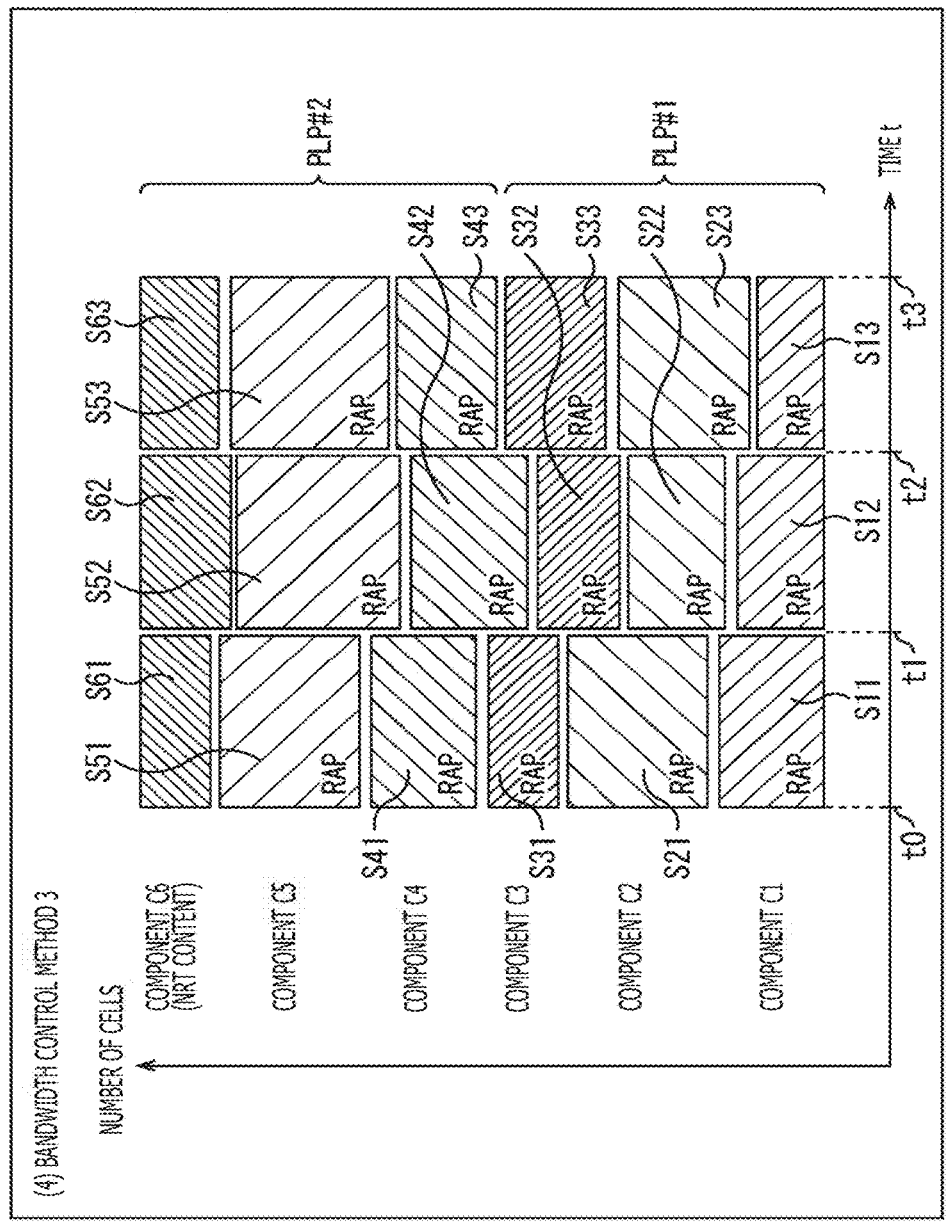
FIG. 16 is a diagram for describing bandwidth control when a bandwidth control method 3 is employed.

FIG. 16 is a diagram for describing the bandwidth control when the bandwidth control method 3 is employed.

In the bandwidth control method 3 in FIG. 16, the scheduler 101 (FIG. 2) performs control such that the bandwidth W is "variable," the segment length T is "constant," and the segment switching time is "simultaneous." That is, in the bandwidth control method 3, the segment length T of each segment S is "constant" while the bandwidth W thereof is "variable." In each component C, therefore, the region of each segment S determined by the bandwidth W and the segment length T (the region having a pattern that is different per segments of each component in the figure) has the same width in the horizontal direction but a different width in the vertical direction.

Further, since the segment switching time is "simultaneous" in the bandwidth control method 3, the segment S switching time in each component C is repeated every fixed period.

For example, paying attention to each segment S of the component C1, the switch between the temporally continuous preceding and succeeding segments S (e.g., the segment S11 and the segment S12, the segment S12 and the segment S13) is performed in sequence at each time t (e.g., time t1 and time t2) every fixed period. At this time, moreover, the bandwidth of each segment S in the component C1 is variable and varies in each segment S.

Similarly, paying attention to each segment S of the component C2, the switch between the temporally continuous preceding and succeeding segments S (e.g., the segment S21 and the segment S22, the segment S22 and the segment S23) is performed in sequence at each time t (e.g., time t1 and time t2) every fixed period. At this time, moreover, the bandwidth of each segment S in the component C2 is variable and varies in each segment S.

Similarly, paying attention to each segment S of the component C3, the switch between the temporally continuous preceding and succeeding segments S (e.g., the segment S31 and the segment S32, the segment S32 and the segment S33) is performed in sequence at each time t (e.g., time t1 and time t2) every fixed period. At this time, moreover, the bandwidth of each segment S in the component C3 is variable and varies in each segment S.

Then, the respective segments S in the component C1 to the component C3 processed by the encoder 1C3-1 to the encoder 103-3 are multiplexed by the multiplexer 104-1, and the resultant multiplexed stream is processed as PLP#1 by the PLP processing unit 105-1.

Further, paying attention to each segment S of the component C4, the switch between the temporally continuous preceding and succeeding segments S (e.g., the segment S41 and the segment S42, the segment S42 and the segment S43) is performed in sequence at each time t (e.g., time t1 and time t2) every fixed period. At this time, moreover, the bandwidth of each segment S in the component C4 is variable and varies in each segment S.

Similarly, paying attention to each segment S of the component C5, the switch between the temporally continuous preceding and succeeding segments S (e.g., the segment S51 and the segment S52, the segment S52 and the segment S53) is performed in sequence at each time t (e.g., time t1 and time t2) every fixed period. At this time, moreover, the bandwidth of each segment S in the component C5 is variable and varies in each segment S.

Similarly, paying attention to each segment of the component C6 (NRT content), the switch between the temporally continuous preceding and succeeding segments S (e.g., the segment S61 and the segment S62, the segment S62 and the segment S63) is performed in sequence at each time t (e.g., time t1 and time t2) every fixed period. At this time, moreover, the bandwidth of each segment S in the component C6 is variable and varies in each segment S.

Then, the respective segments S in the component C4 to the component C6 processed by the encoder 103-4 to the NRT processing unit 103-6 are multiplexed by the multiplexer 104-2, and the resultant multiplexed stream is processed as PLP#2 by the PLP processing unit 105-2.

As described above, in the bandwidth control method 3 in FIG. 16, the switch between the temporally continuous segments S in each component C is performed simultaneously at each time t (e.g., time t1 and time t2) every fixed period.

Specifically, for example, at time t1, the switches between the segment S11 and the segment S12 of the component C1, between the segment S21 and the segment S22 of the component C2, between the segment S31 and the segment S32 of the component C3, between the segment S41 and the segment S42 of the component C4, between the segment S51 and the segment S52 of the component C5, and between the segment S61 and the segment S62 of the component C6 are performed simultaneously.

Further, for example, at time t2, the switches between the segment S12 and the segment S13 of the component C1, between the segment S22 and the segment S23 of the component C2, between the segment S32 and the segment S33 of the component C3, between the segment S42 and the segment S43 of the component C4, between the segment S52 and the segment S53 of the component C5, and between the segment S62 and the segment S63 of the component C6 are performed simultaneously.

Note, however, that the bandwidth of each segment S in the component C1 to the component C6 is variable and thus varies from segment S to segment S in each component C.

The bandwidth control when the bandwidth control method 3 is employed has been described above.

(5) Bandwidth Control Method 3A

Figure 17:
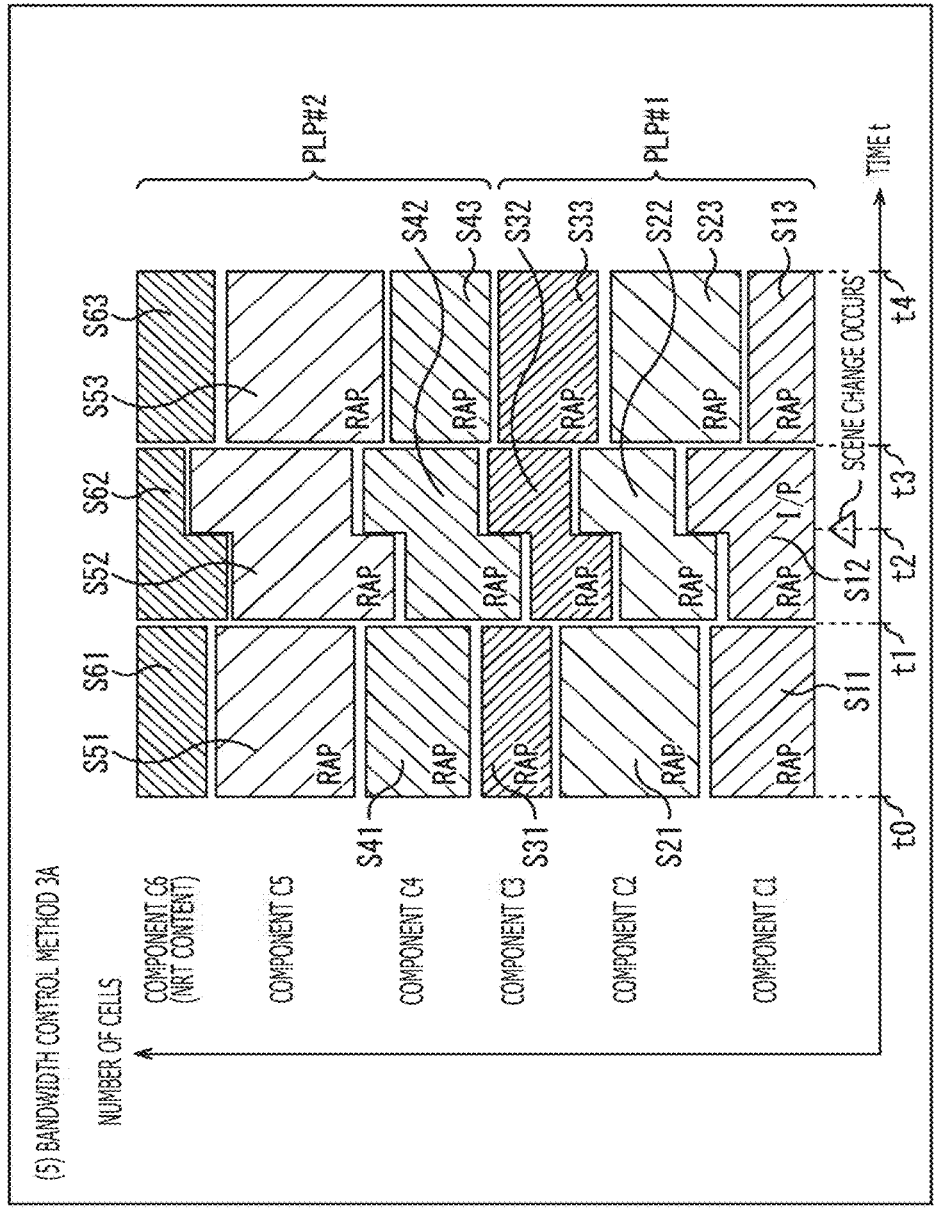
FIG. 17 is a diagram for describing bandwidth control when a bandwidth control method 3A is employed.

FIG. 17 is a diagram for describing the bandwidth control when the bandwidth control method 3A is employed.

The bandwidth control method 3A in FIG. 17 has in common with the bandwidth control method 3 (FIG. 16) in that the scheduler 101 (FIG. 2) performs control such that the bandwidth W is "variable," the segment length T is "constant," and the segment switching time is "simultaneous." On the other hand, the bandwidth control method 3A is different from the bandwidth control method 3 (FIG. 16) in that when the scene change occurs, processing is performed using the segment bandwidth change method. This point will be mainly described below.

That is, in the bandwidth control method 3A, the segment length T of each segment S is "constant" while the bandwidth W thereof is "variable." In each component C, therefore, the region of each segment S determined by the bandwidth W and the segment length T (the region having a pattern that is different per segments of each component in the figure) has the same width in the horizontal direction but a different width in the vertical direction. Further, since the segment switching time is "simultaneous" in the bandwidth control method 3A, the segment S switching time in each component C is a fixed period.

Here, paying attention to each segment S of the component C1, when the scene change occurs at time t2, the bandwidth W of the segment S12 is widened at this point according to the segment bandwidth change method. This increases the bandwidth within the segment S12 (temporarily). In this case, for example, even when an I frame or a P frame is inserted, it is possible to minimize the deterioration of the image quality at the occurrence of the scene change because of the bandwidth being increased within the segment S.

Further, in this example, although the bandwidths of the segment S22, the segment S32, the segment S42, and the segment S52 move upward in conjunction with the widening of the bandwidth W of the segment S12 at time t2, the scene change in the segment 12 can be handled without reducing the bandwidths of these segments S. This is because the bandwidth of the NRT content (component C6) is used as, so to speak, a margin.

The bandwidth control when the bandwidth control method 3A is employed has been described above.

(6) Bandwidth Control Method 4

Figure 18:
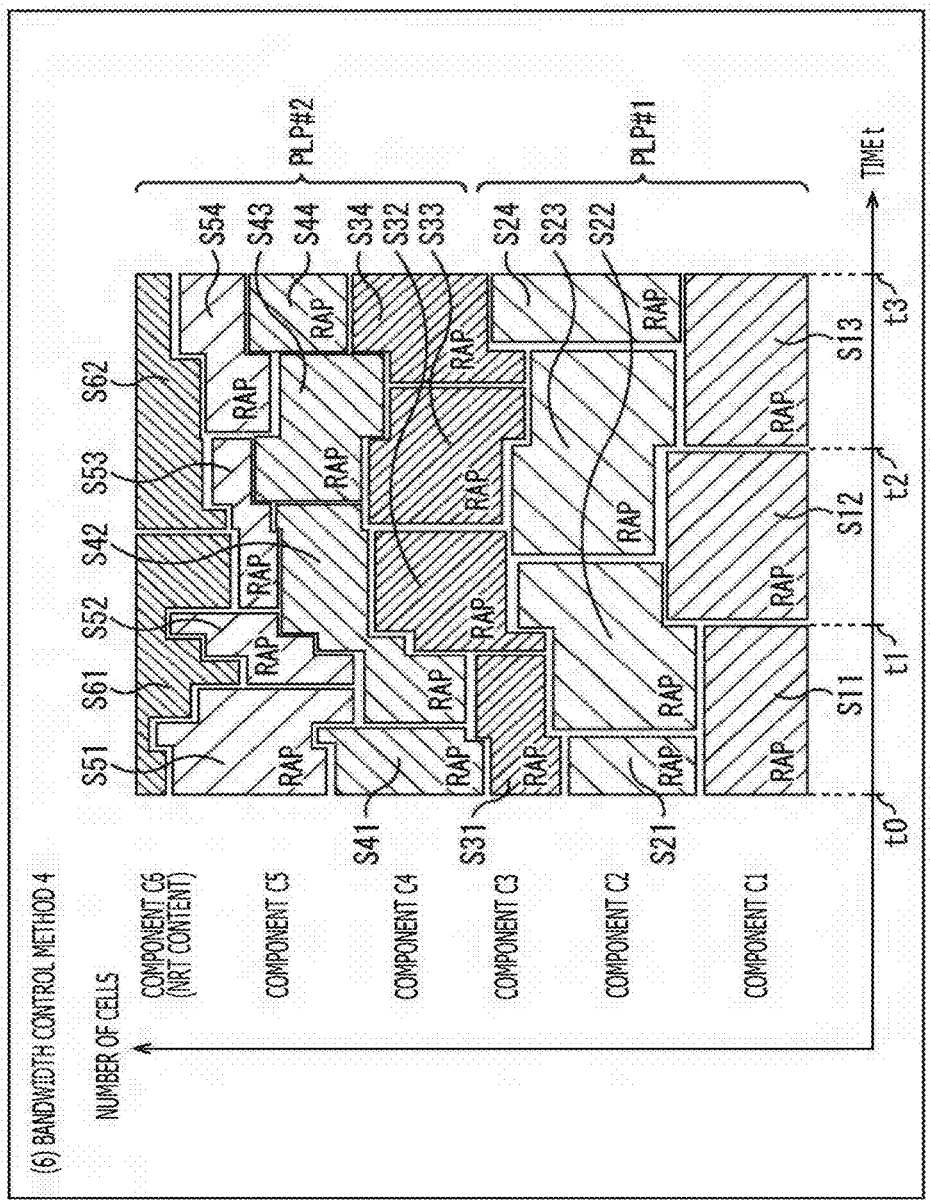
FIG. 18 is a diagram for describing bandwidth control when a bandwidth control method 4 is employed.

FIG. 18 is a diagram for describing the bandwidth control when the bandwidth control method 4 is employed.

In the bandwidth control method 4 in FIG. 18, the scheduler 1C1 (FIG. 2) performs control such that the bandwidth W is "variable," the segment length T is "constant/variable," and the segment switching time is "individual." That is, in the bandwidth control method 4, the bandwidth W of each segment S is "variable," and the segment length T thereof is "constant/variable." In each component C, therefore, the region of each segment S determined by the bandwidth W and the segment length T (the region having a pattern that is different per segments of each component in the figure) does not have either the same width in the vertical direction or the same width in the horizontal direction.

Further, since the segment switching time is "individual" in the bandwidth control method 4, the segment S switching time in each component C is not a fixed period.

For example, paying attention to each segment S of the component C1, the switch between the temporally continuous preceding and succeeding segments S (e.g., the segment S11 and the segment S12, the segment S12 and the segment S13) is performed in sequence at each time t (e.g., time t1 and time t2) every variable period. At this time, moreover, the bandwidth of each segment S in the component C1 is variable and varies in each segment S.

Similarly, paying attention to each segment S of the component C2, the switch between the temporally continuous preceding and succeeding segments S (e.g., the segment S21 and the segment S22, the segment S22 and the segment S23, the segment S23 and the segment S24) is performed in sequence at each time t (e.g., time other than time t1 and time t2) every variable period. At this time, moreover, the bandwidth of each segment S in the component C2 is variable and varies in each segment S.

Similarly, paying attention to each segment S of the component C3, the switch between the temporally continuous preceding and succeeding segments S (e.g., the segment S31 and the segment S32, the segment S32 and the segment S33, the segment S33 and the segment S34) is performed in sequence at each time t (e.g., time other than time t1 and time t2) every variable period. At this time, moreover, the bandwidth of each segment S in the component C3 is variable and varies in each segment S.

Then, the respective segments S of the component C1 to the component C3 processed by the encoder 103-1 to the encoder 103-3 are multiplexed by the multiplexer 104-1, and the resultant multiplexed stream is processed as PLP#1 by the PLP processing unit 105-1.

Further, paying attention to each segment S of the component C4, the switch between the temporally continuous preceding and succeeding segments S (e.g., the segment S41 and the segment S42, the segment S42 and the segment S43) is performed in sequence at each time t (e.g., time other than time t1 and time t2) every variable period. At this time, moreover, the bandwidth of each segment S in the component C4 is variable and varies in each segment S.

Similarly, paying attention to each segment S of the component C5, the switch between the temporally continuous preceding and succeeding segments S (e.g., the segment S51 and the segment S52, the segment S52 and the segment S53) is performed in sequence at each time t (e.g., time other than time t1 and time t2) every variable period. At this time, moreover, the bandwidth of each segment S in the component C5 is variable and varies in each segment S.

Similarly, paying attention to each segment of the component C6 (NRT content), the switch between the temporally continuous preceding and succeeding segments S (e.g., the segment S61 and the segment S62, the segment S62 and the segment S63) is performed in sequence at each time t (e.g., time other than time t1 and time t2) every variable period. At this time, moreover, the bandwidth of each segment S in the component C6 is variable and varies in each segment S.

Then, the respective segments S in the component C4 to the component C6 processed by the encoder 103-4 to the NRT processing unit 103-6 are multiplexed by the multiplexer 104-2, and the resultant multiplexed stream is processed as PLP#2 by the PLP processing unit 105-2.

As described above, in the bandwidth control method 4 in FIG. 18, the switch between the temporally continuous segments S in each component C is not performed simultaneously but performed at each time t (e.g., time t1 and time t2) every variable period.

Specifically, for example, the switch between the segment S11 and the segment S12 in the component C1 is performed at time t1, but the switch between the segments S is not performed in the components C2 to C6 at this time. Further, for example, the switch between the segment S12 and the segment S13 in the component C1 is performed at time t2, but the switch between the segments S is not performed in the components C2 to C6 at this time.

Note that although everything will not be described to avoid repetition, the components C2 to C6 are also similar. When the switch between its own segments S is performed, there is no switch between other segments S in the other components C at this timing.

The bandwidth control when the bandwidth control method 4 is employed has been described above.

(7) Bandwidth Control Method 4A

Figure 19:
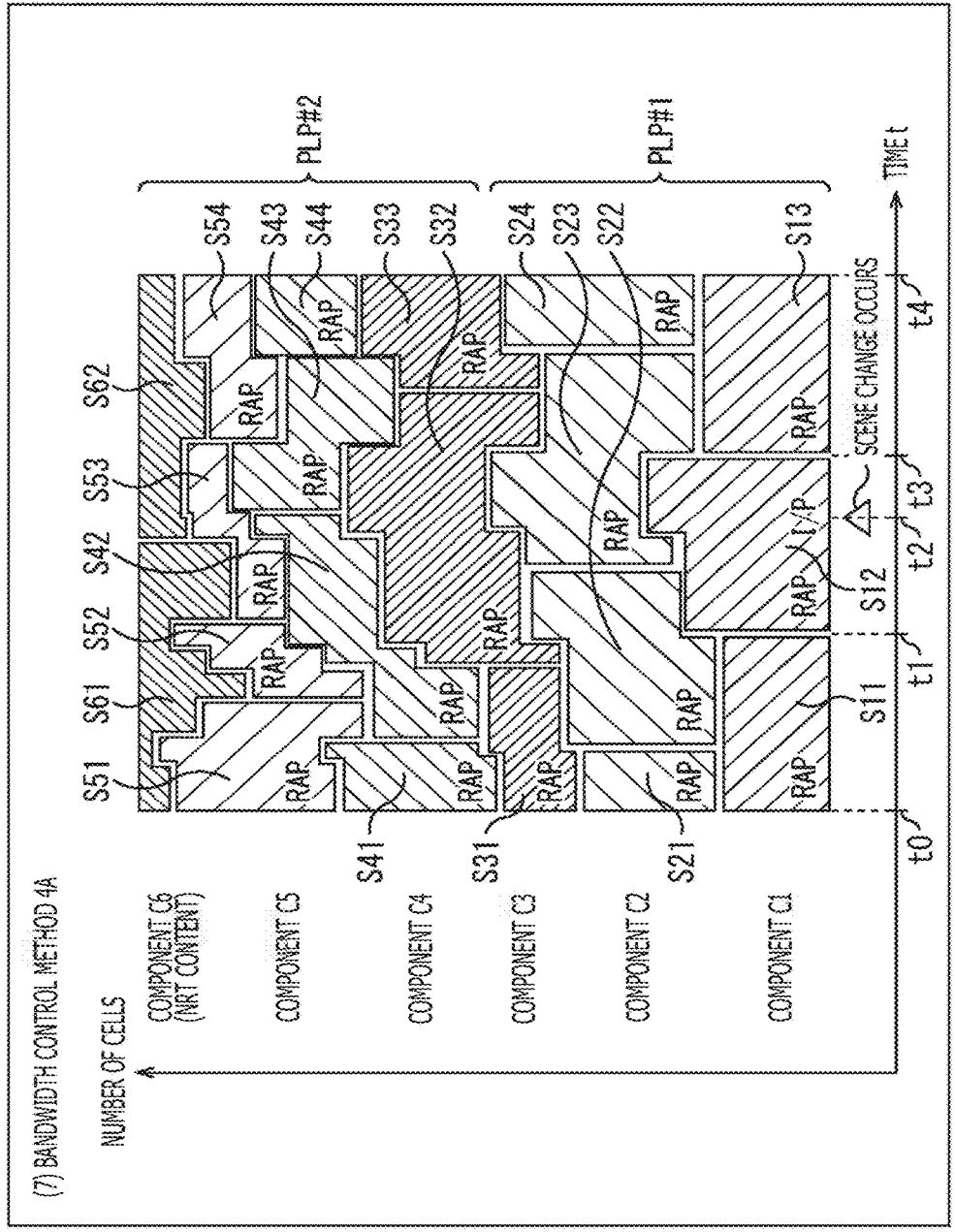
FIG. 19 is a diagram for describing bandwidth control when a bandwidth control method 4A is employed.

FIG. 19 is a diagram for describing the bandwidth control when the bandwidth control method 4A is employed.

Here, the bandwidth control method 4A in FIG. 19 has in common with the bandwidth control method 4 (FIG. 18) in that the scheduler 101 (FIG. 2) performs control such that the bandwidth W is "variable," the segment length T is "constant/variable," and the segment switching time is "individual." On the other hand, the bandwidth control method 4A is different from the bandwidth control method 4 (FIG. 18) in that when the scene change occurs, processing is performed using the segment bandwidth change method. This point will be mainly described below.

That is, in the bandwidth control method 4A, the bandwidth W of each segment S is "variable," and the segment length T thereof is "constant/variable." In each component C, therefore, the region of each segment S determined by the bandwidth W and the segment length T (the region having a pattern that is different per segments of each component in the figure) does not have either the same width in the vertical direction or the same width in the horizontal direction. Further, since the segment switching time is "individual" in the bandwidth control method 4A, the segment S switching time in each component C is not a fixed period.

Here, paying attention to each segment S of the component C1, when the scene change occurs at time t2, the bandwidth W of the segment S12 is widened at this point according to the segment bandwidth change method. This increases the bandwidth within the segment S12 (temporarily). In this case, for example, even when an I frame or a P frame is inserted, it is possible to minimize the deterioration of the image quality at the occurrence of the scene change because of the bandwidth being increased within the segment S.

Further, in this example, although the bandwidths of the segment S23, the segment S32, the segment S42, the segment S43, and the segment S53 move upward in conjunction with the widening of the bandwidth W of the segment S12 at time t2, the scene change in the segment 12 can be handled without reducing the bandwidths of these segments S. This is because the bandwidth of the NRT content (component C6) is used as, so to speak, a margin.

The bandwidth control when the bandwidth control method 4A is employed has been described above.

(8) Bandwidth Control Method 4B

Figure 20:
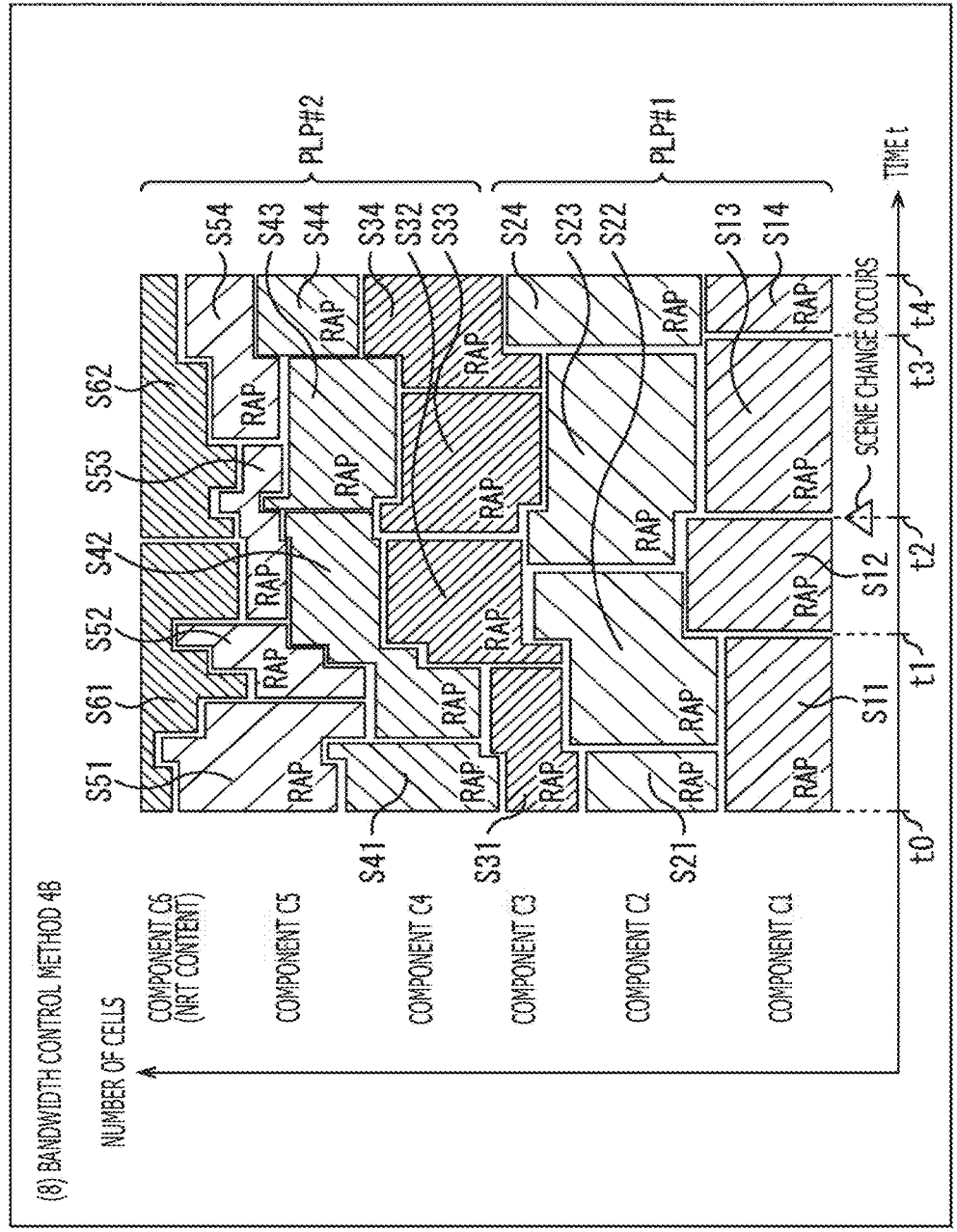
FIG. 20 is a diagram for describing bandwidth control when a bandwidth control method 4B is employed.

FIG. 20 is a diagram for describing the bandwidth control when the bandwidth control method 4B is employed.

The bandwidth control method 4B in FIG. 20 has in common with the bandwidth control method 4 (FIG. 18) in that the scheduler 101 (FIG. 2) performs control such that the bandwidth W is "variable," the segment length T is "constant/variable," and the segment switching time is "individual." On the other hand, the bandwidth control method 4B is different from the bandwidth control method 4 (FIG. 18) in that when the scene change occurs, processing is performed using the segment division method. This point will be mainly described below.

That is, in the bandwidth control method 4B, the bandwidth W of each segment S is "variable," and the segment length T thereof is "constant/variable." In each component C, therefore, the region of each segment S determined by the bandwidth W and the segment length T (the region having a pattern that is different per segments of each component in the figure) does not have either the same width in the vertical direction or the same width in the horizontal direction. Further, since the segment switching time is "individual" in the bandwidth control method 4A, the segment S switching time in each component C is not a fixed period.

Here, paying attention to each segment S of the component C1, when the scene change occurs at time t2 at which the segment S12 is being processed, the segment S12 is forcibly terminated at this point even in the middle of the predetermined segment length and the processing of the new segment S13 is started according to the segment division method. This can minimize the deterioration of the image quality at the occurrence of the scene change without two I frames existing in the segment S, for example.

The bandwidth control when the bandwidth control method 4B is employed has been described above.

<4. Flow of Processing Executed by Each Device>

Next, the flow of processing executed by the transmission device 10 and the receiving device 20 included in the transmission system 1 in FIG. 1 will be described with reference to the flowcharts in FIG. 21 to FIG. 23.

(Flow of Data Processing on Transmission Side)

First, a flow of data processing on the transmission side executed by the transmission device 10 in FIG. 1 will be described with reference to the flowchart in FIG. 21.

In step S101, the scheduler 101 performs scheduling processing. In this scheduling processing, processing related to the control over encoding performed by the encoder 103-1 to the NRT processing unit 103-6 and processing related to the bandwidth control over the PLPs performed by the PLP processing unit 105-1 and the PLP processing unit 105-2 are performed. Note that the details of the scheduling processing will be described later with reference to the flowchart in FIG. 22.

In step S102, the encoder 103-1 to the NRT processing unit 103-6 perform component processing. In this component processing, the data of the component C1 to the component C6 are processed (encoded) in units of segments corresponding to the target code amounts calculated by the processing in step S101.

Note that the data of the component C1 to the component C3 are multiplexed by the multiplexer 104-1, while the data of the component C4 to the component C6 are multiplexed by the multiplexer 104-2.

In step S103, the PLP processing unit 105-1 and the PLP processing unit 105-2 perform PLP processing. In this PLP processing, the PLP processing unit 105-1 performs bandwidth control over PLP#1 on the basis of the number of cells of PLP#1 calculated by the processing in step S101. Further, the PLP processing unit 105-2 performs bandwidth control over PLP#2 on the basis of the number of cells of PLP#2 calculated by the processing in step S101.

In step S104, the physical-layer processing unit 106 performs physical layer processing. In this physical layer processing, a physical layer frame in which the PLPs corresponding to the bandwidth control by the processing in step S103 are arranged in the payload is generated.

In step S105, the transmission unit 107 performs processing of transmitting a digital broadcast signal. In this transmission processing, the physical layer frame generated by the processing in step S104 is processed and transmitted as the digital broadcast signal of the IP transmission method.

Figure 21:
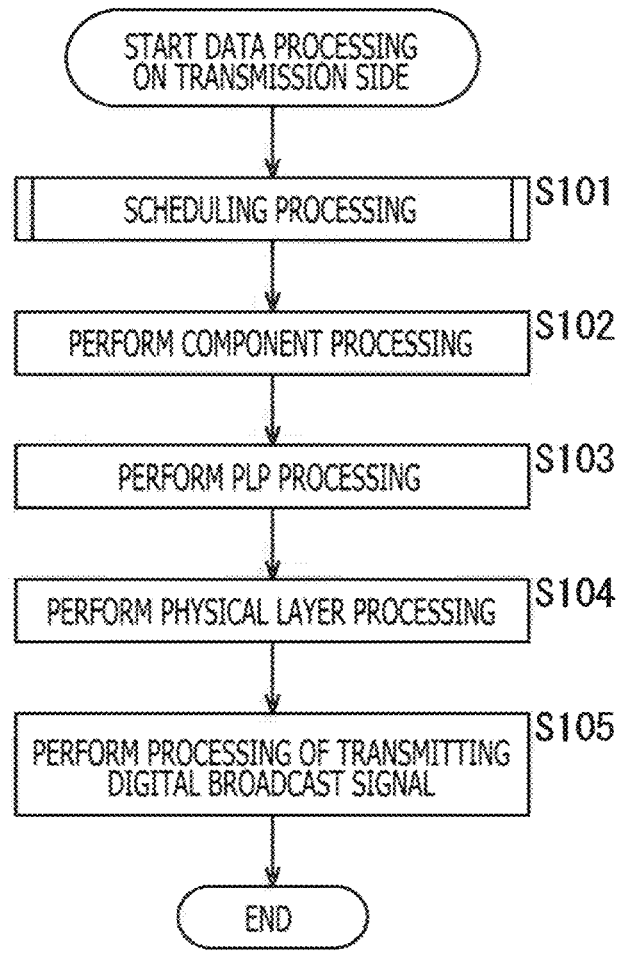
FIG. 21 is a flowchart for describing a flow of data processing on a transmission side.
Figure 22:
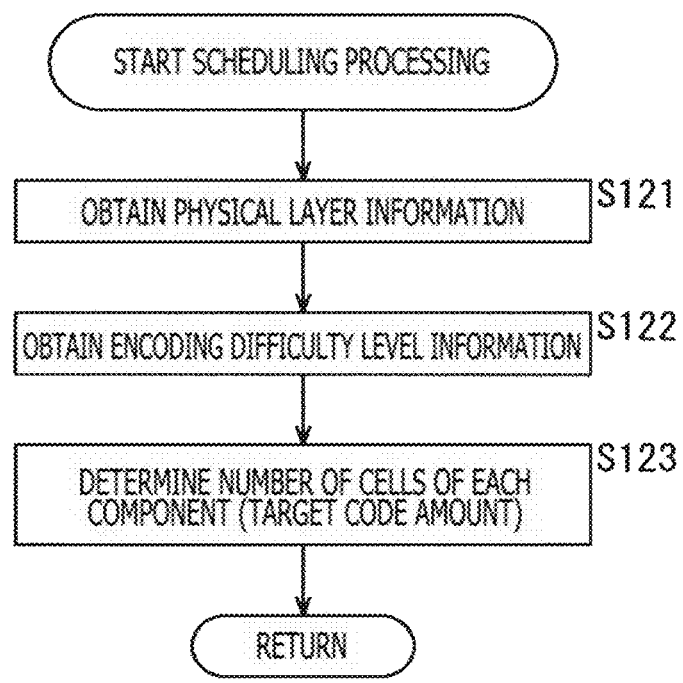
FIG. 22 is a flowchart for describing a detailed flow of scheduling processing.

When the processing in step S105 ends, the data processing on the transmission side in FIG. 21 ends.

The flow of the data processing on the transmission side has been described above.

(Flow of Scheduling Processing)

Next, a flow of the detailed processing of the scheduling processing corresponding to the processing in step S101 in FIG. 21 will be described with reference to the flowchart in FIG. 22.

In step S121, the scheduler 101 obtains physical layer information inputted thereto. This physical layer information includes the total number of cells indicating the number of cells in the entire physical layer frame and modulation parameters for each PLP.

In step S122, the scheduler 101 obtains encoding difficulty level information supplied from each of the encoder 103-1 to the NRT processing unit 103-6.

In step S123, the scheduler 101 determines the number of cells of each component.

Here, for example, the number of cells of each component can be determined on the basis of the encoding difficulty level information and the like obtained by the processing in step S122. Further, the target code amounts can be obtained from the number of cells of each component by using the modulation parameters for each PLP obtained by the processing in step S121. The target code amounts obtained in this way are each supplied to the encoder 103-1 to the NRT processing unit 103-6.

Further, for example, the number of cells of PLP#1 and the number of cells of PLP#2 can be calculated on the basis of the number of cells of each component determined by the processing in step S123. Then, the number of cells of PLP#1 is supplied to the PLP processing unit 105-1, while the number of cells of PLP#2 is supplied to the PLP processing unit 105-2.

When the processing in step S123 ends, the processing returns to the processing in step S101 in FIG. 21 and the processing thereafter is executed.

The flow of the scheduling processing has been described above.

(Flow of Data Processing on Receiving Side)

Next, a flow of data processing on the receiving side executed by the receiving device 20 in FIG. 1 will be described with reference to the flowchart in FIG. 23.

In step S201, the receiving unit 201 performs processing of receiving the digital broadcast signal. In this receiving processing, the digital broadcast signal of the IP transmission method transmitted from the transmission device 10 via the transmission path 30 is received.

In step S202, the demodulation processing unit 202 performs demodulation processing on the signal obtained by the processing in step S201. In this demodulation processing, OFDM demodulation, error correction processing, and the like are performed. Note that the multiplexed stream obtained by this demodulation processing is demultiplexed into the data of the components by the demultiplexer 203.

In step S203, the decoder 204 decodes the data of the components obtained by the processing in step S202 according to a given decoding method.

In step S204, the output unit 205 displays a moving image corresponding to the video data obtained by the processing in step S203. Further, the output unit 205 outputs sound corresponding to the audio data obtained by the processing in step S203.

Figure 23:
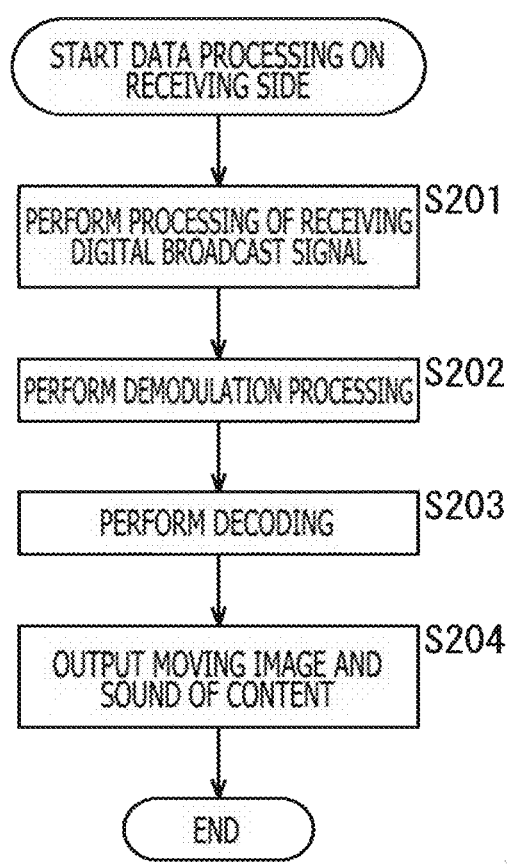
FIG. 23 is a flowchart for describing a flow of data processing on a receiving side.

When the processing in step S204 ends, the data processing on the receiving side in FIG. 23 ends.

The flow of the data processing on the receiving side has been described above.

<5. Modification>

(Another Exemplary Configuration of Transmission Device)

Figure 24:
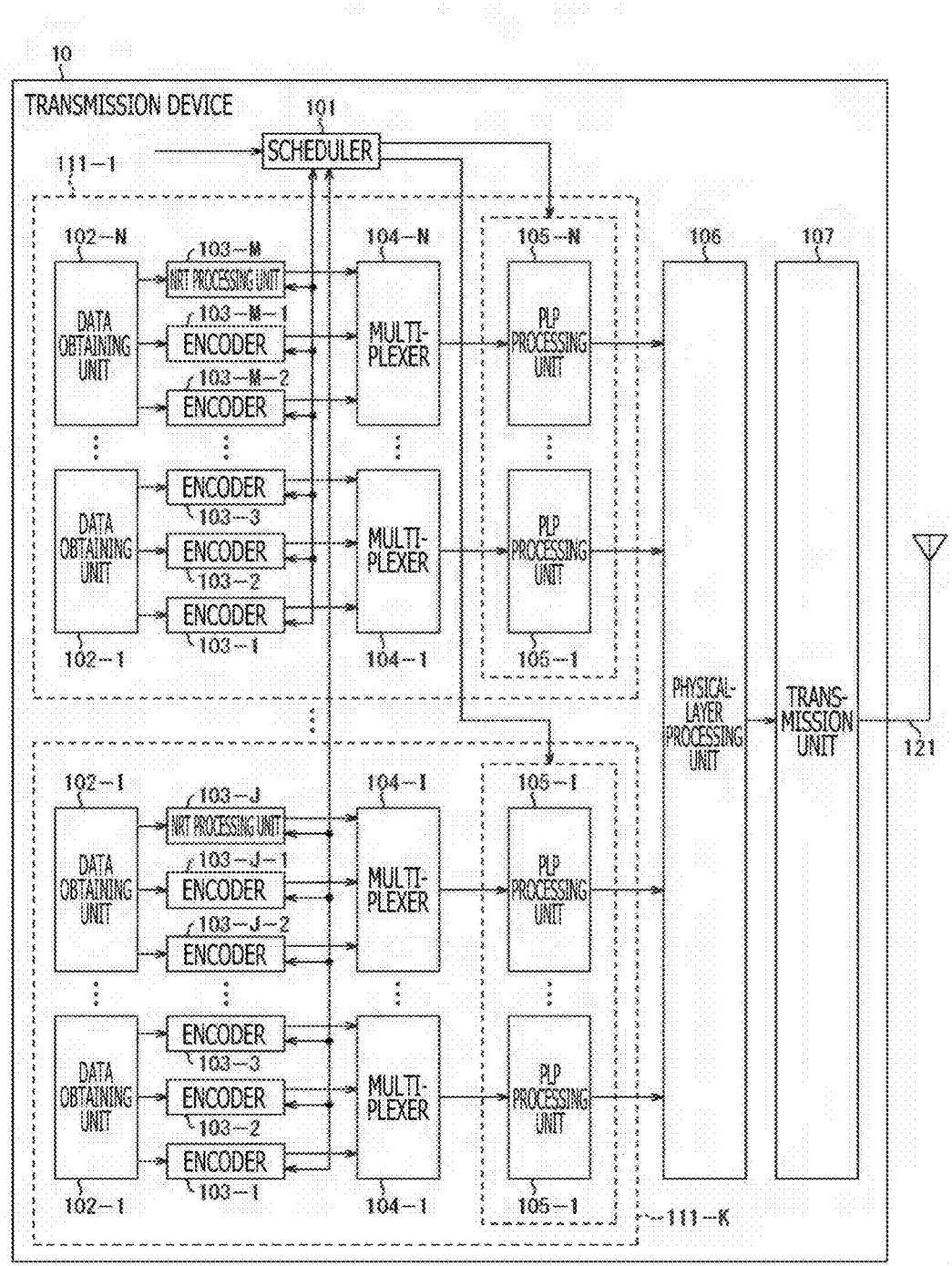
FIG. 24 is a diagram illustrating another exemplary configuration of the transmission device.

Incidentally, ATSC 3.0 employs channel bonding in which a plurality of channels (frequency bands) are bonded and used. FIG. 24 illustrates an exemplary configuration of the transmission device 10 conforming to this channel bonding. In the transmission device 10 in FIG. 24, the plurality of channels (frequency bands) are bonded and used by the physical-layer processing unit 106.

Further, a frequency hopping method may be employed in the channel bonding. Here, the frequency hopping is a technology by which the frequency band being used is changed at given time intervals with a view to addressing fading and the like.

Note that in the above description, although the components have been mainly described as the data that require securement of the bandwidths for ease of description, real-time data (e.g., service information (SI)) other than non-real-time data such as the NRT content need the securement of the bandwidths. The bandwidth control over such real-time data can also be performed in a similar way to the above-described components.

Further, although ATSC (ATSC 3.0 in particular), which is the method employed in the United States of America and the like, has been described as the digital broadcasting standard in the above description, the present technology may be applied to the ISDB (Integrated Services Digital Broadcasting), the DVB (Digital Video Broadcasting), and the like. The ISDB is the method employed in Japan and the like. The DVB is the method employed in European countries and the like. Moreover, the present technology can be applied to satellite broadcasting such as BSs (Broadcasting Satellites) and CSs (Communications Satellites), cable broadcasting such as cable television (CATV), and the like, in addition to the terrestrial broadcasting, as the digital broadcasting.

Further, the present technology can also be applied to the given standards (standards other than the digital broadcasting standards) and the like which are defined on the assumption that the transmission path other than the broadcasting network, i.e., a communication line (communication network) or the like such as, for example, the Internet, a telephone network, or the like is used as the transmission path. In this case, the communication line such as the Internet, the telephone network, or the like can be used as the transmission path 30, while the transmission device 10 can serve as a server provided on the Internet. Then, by including a communication function in the receiving device 20, the transmission device 10 performs processing in response to a request from the receiving device 20.

<6. Computer Configuration>

Figure 25:
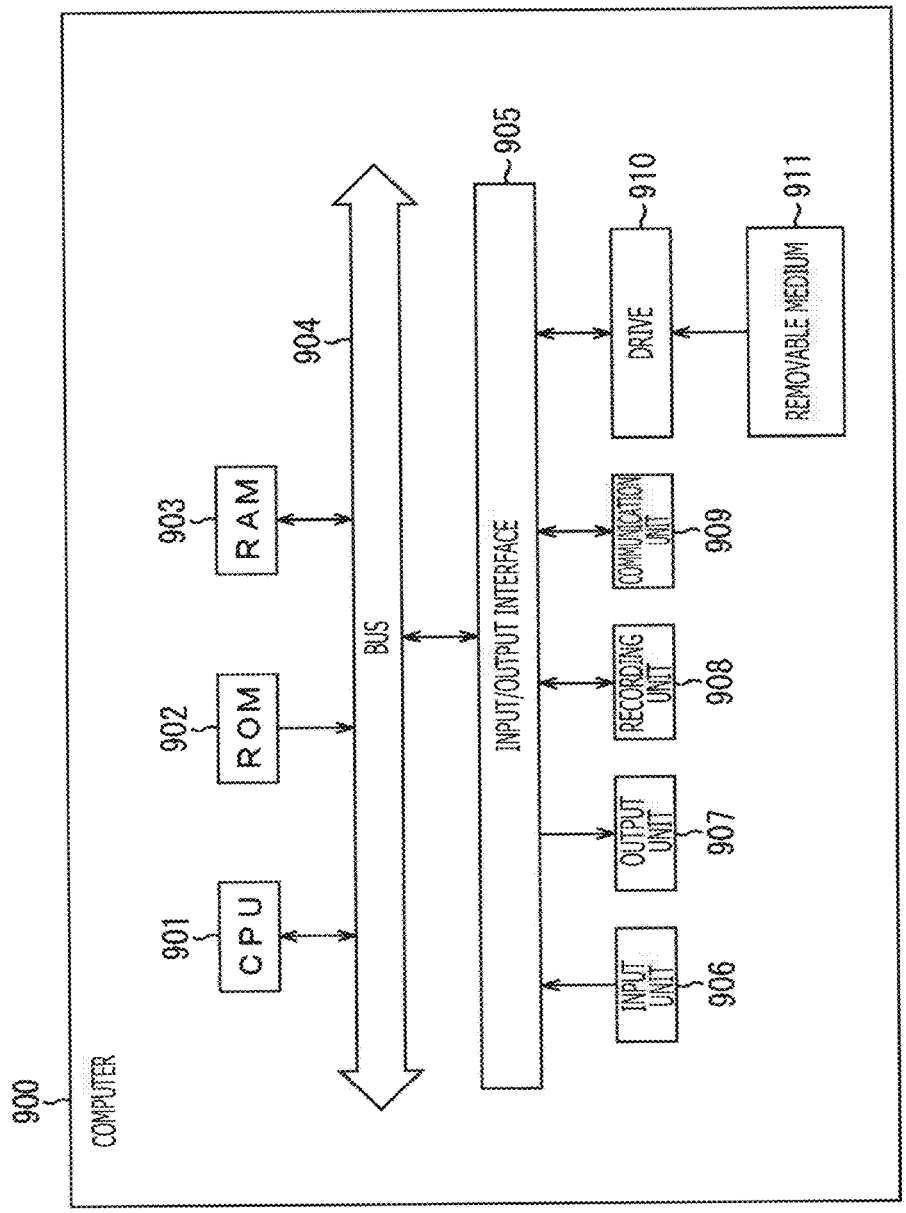
FIG. 25 is a diagram illustrating an exemplary configuration of a computer.

The series of processing described above can be executed by hardware or software. When the series of processing is to be executed by software, a program constituting the software is installed in a computer. FIG. 25 is a diagram illustrating an exemplary hardware configuration of the computer in which the program executes the series of processing described above.

In a computer 900, a CPU (Central Processing Unit) 901, ROM (Read Only Memory) 902, and RAM (Random Access Memory) 903 are mutually connected via a bus 904. Moreover, an input/output interface 905 is connected to the bus 904. An input unit 906, an output unit 907, a recording unit 908, a communication unit 909, and a drive 910 are connected to the input/output interface 905.

The input unit 906 includes a keyboard, a mouse, a microphone, and the like. The output unit 907 includes a display, a speaker, and the like. The recording unit 908 includes a hard disk, non-volatile memory, and the like. The communication unit 909 includes a network interface and the like. The drive 910 drives a removable medium 911 such as a magnetic disk, an optical disk, a magneto-optical disk, semiconductor memory, or the like.

In the computer 900 configured as above, the CPU 901 loads the program recorded in the ROM 902 or the recording unit 908 into the RAM 903 via the input/output interface 905 and the bus 904 and executes the program, through which the above-described series of processing is performed.

The program to be executed by the computer 900 (CPU 901) can be recorded and provided on the removable medium 911 as a package medium or the like, for example. Further, the program can be provided via a wired or wireless transmission medium such as a local area network, the Internet, or digital satellite broadcasting.

In the computer 900, the program can be installed in the recording unit 908 via the input/output interface 905 by attaching the removable medium 911 to the drive 910. Further, the program can be received by the communication unit 909 via a wired or wireless transmission medium and installed in the recording unit 908. Otherwise, the program can be installed in advance in the ROM 902 or the recording unit 908.

Here, the processing performed by the computer according to the program in the present specification does not necessarily need to be performed in the time sequence following the order described as the flowcharts. That is, the processing performed by the computer according to the program also includes processing that is executed in parallel or individually (e.g., parallel processing or processing by an object). Further, the program may be processed by a single computer (processor) or by a plurality of computers in a distributed manner.

Note that the embodiment of the present technology is not limited to the above-described embodiment and various modifications can be made without departing from the gist of the present technology.

Further, the present technology can be configured as follows.

(1)
A transmission device including:
a processing unit that determines the number of cells of a component to be transmitted by each of PLPs (Physical Layer Pipes) such that the number of cells in an entire physical layer frame including the plurality of PLPs matches a sum of the number of cells of the plurality of PLPs; and
a transmission unit that transmits a broadcast stream including the physical layer frame.

(2)
The transmission device according to (1),
in which the component is processed in units of segments, the segments each being determined by a segment length and a bandwidth.

(3)
The transmission device according to (2),
in which the processing unit dynamically changes code amounts of the segments by variably controlling at least one of the segment length and the bandwidth for each segment.

(4)
The transmission device according to (1),
in which each of the plurality of PLPs has a different modulation parameter.

(5)
The transmission device according to (2),
in which when a generated code amount of the component is changed, the processing unit increases or decreases a bandwidth within a target segment.

(6)
The transmission device according to (2),
in which when a generated code amount of the component is increased, the processing unit terminates a target segment and starts a new segment.

(7)
The transmission device according to (2),
in which when a non-real-time component is included as the component, the processing unit controls a bandwidth of a segment of the non-real-time component according to a generated code amount of a real-time component.

(8)
The transmission device according to any one of (1) to (7),
in which the number of cells in the entire physical layer frame is a parameter uniquely determined when a structure of the physical layer frame is determined.

(9)
A data processing method in a transmission device, the data processing method including the steps of:
by the transmission device,
determining the number of cells of a component to be transmitted by each of PLPs such that the number of cells in an entire physical layer frame including the plurality of PLPs matches a sum of the number of cells of the plurality of PLPs; and
transmitting a broadcast stream including the physical layer frame.

(10)
A receiving device including:
a receiving unit that receives a broadcast stream including a physical layer frame, the physical layer frame which includes a plurality of PLPs and in which the number of cells of a component transmitted by each of the PLPs is allocated such that the number of cells in the entire physical layer frame matches a sum of the number of cells of the plurality of PLPs; and
a processing unit that processes the physical layer frame.

(11)
The receiving device according to (10),
in which each of the plurality of PLPs has a different modulation parameter.

(12)
A data processing method in a receiving device, the data processing method including the steps of:
by the receiving device,
receiving a broadcast stream including a physical layer frame, the physical layer frame which includes a plurality of PLPs and in which the number of cells of a component transmitted by each of the PLPs is allocated such that the number of cells in the entire physical layer frame matches a sum of the number of cells of the plurality of PLPs; and
processing the physical layer frame.

REFERENCE SIGNS LIST

1 Transmission system
10 Transmission device
20 Receiving device
30 Transmission path
101 Scheduler
102-1, 102-2 Data obtaining unit
103-1 to 103-5 Encoder
103-6 NRT processing unit
104-1, 104-2 Multiplexer
105-1, 105-2 PLP processing unit
106 Physical-layer processing unit
107 Transmission unit
201 Receiving unit
202 Demodulation processing unit
203 Demultiplexer
204 Decoder
205 Output unit
900 Computer
901 CPU

The invention claimed is:

1. A transmission device comprising:
circuitry configured to:
determine a number of cells of a component to be transmitted by each of a plurality of PLPs (Physical Layer Pipes) such that a number of cells in an entire physical layer frame including each of the plurality of PLPs matches a sum of a number of cells to be transmitted by each of the plurality of PLPs;
change a number of cells to be transmitted by one of the plurality of PLPs; and
transmit a broadcast stream including the physical layer frame,
wherein the number of cells in the entire physical layer frame remains the same from before the change to after the change.

2. The transmission device according to claim 1, wherein the component is processed in units of segments, and
the segments are each determined by a segment length and a bandwidth.

3. The transmission device according to claim 2, wherein the circuitry is further configured to dynamically change code amounts of the segments by variably controlling at least one of the segment length and the bandwidth for each segment.

4. The transmission device according to claim 2, wherein when a generated code amount of the component is changed, the circuitry is configured to increase or decrease a bandwidth within a target segment.

5. The transmission device according to claim 2, wherein when a generated code amount of the component is increased, the circuitry is configured to terminate a target segment and start a new segment.

6. The transmission device according to claim 2, wherein when a non-real-time component is included as the component, the circuitry is configured to control a bandwidth of a segment of the non-real-time component according to a generated code amount of a real-time component.

7. The transmission device according to claim 1, wherein each of the plurality of PLPs has a different modulation parameter.

8. The transmission device according to claim 1, wherein the number of cells in the entire physical layer frame is a parameter uniquely determined when a structure of the physical layer frame is determined.

9. The transmission device according to claim 1, wherein the change in the number of cells to be transmitted by the one of the plurality of PLPS results in a corresponding change in a number of cells to be transmitted by another of the plurality of PLPs.

10. The transmission device according to claim 1, wherein an increase in the number of cells to be transmitted by the one of the plurality of PLPS results in a corresponding decrease in a number of cells to be transmitted by another of the plurality of PLPs.

11. The transmission device according to claim 1, wherein a decrease in the number of cells to be transmitted by the one of the plurality of PLPS results in a corresponding increase in a number of cells to be transmitted by another of the plurality of PLPs.

12. A data processing method in a transmission device, the data processing method comprising the steps of:
determining, via circuitry of the transmission device, a number of cells of a component to be transmitted by each of a plurality of PLPs such that a number of cells in an entire physical layer frame including each of the plurality of PLPs matches a sum of a number of cells to be transmitted by each of the plurality of PLPs;
changing, via the circuitry, a number of cells to be transmitted by one of the plurality of PLPs; and
transmitting a broadcast stream including the physical layer frame,
wherein the number of cells in the entire physical layer frame remains the same from before the change to after the change.

13. A receiving device comprising:
circuitry configured to
receive a broadcast stream including a first physical layer frame and a second physical layer frame, the first and second physical layer frames including each of a plurality of PLPs in which a number of cells of a component transmitted by each of the plurality of PLPs is allocated such that a number of cells in the entire physical layer frame matches a sum of a number of cells to be transmitted by each of the plurality of PLPs; and
process the first and second physical layer frames, wherein
a number of cells transmitted by one of the plurality of PLPs in the second physical layer frame is different from a number of cells transmitted by the one of the plurality of PLPs in the first physical layer frame, and
the number of cells in the entire second physical layer frame is the same as the number of cells in the entire first physical layer frame.

14. The receiving device according to claim 13, wherein each of the plurality of PLPs has a different modulation parameter.

15. A data processing method in a receiving device, the data processing method comprising the steps of:
receiving a broadcast stream including a first physical layer frame and a second physical layer frame, the first and second physical layer frames including each of a plurality of PLPs and in which a number of cells of a component transmitted by each of the plurality if PLPs is allocated such that a number of cells in the entire physical layer frame matches a sum of a number of cells to be transmitted by each of the plurality of PLPs; and processing, via circuitry of the receiving device, the first and second physical layer frames, wherein a number of cells transmitted by one of the plurality of PLPs in the second physical layer frame is different from a number of cells transmitted by the one of the plurality of PLPs in the first physical layer frame, and the number of cells in the entire second physical layer frame is the same as the number of cells in the entire first physical layer frame.

* * * * *